United States Patent [19]
Hohle et al.

[11] Patent Number: 6,101,477
[45] Date of Patent: Aug. 8, 2000

[54] METHODS AND APPARATUS FOR A TRAVEL-RELATED MULTI-FUNCTION SMARTCARD

[75] Inventors: William Hohle, Lehi; Frederic Petit, Sandy, both of Utah

[73] Assignee: American Express Travel Related Services Company, Inc., New York, N.Y.

[21] Appl. No.: 09/012,750

[22] Filed: Jan. 23, 1998

[51] Int. Cl.[7] .................................................. G06F 17/60
[52] U.S. Cl. ........................... 705/1; 705/5; 235/380; 235/384
[58] Field of Search ..................... 705/1, 5, 6; 235/375, 235/380, 379, 382, 384

[56] References Cited

U.S. PATENT DOCUMENTS

| | | | |
|---|---|---|---|
| 4,816,653 | 3/1989 | Anderl et al. | 235/380 |
| 4,882,474 | 11/1998 | Anderl et al. | 235/492 |
| 4,928,001 | 5/1990 | Masada | 235/380 |
| 5,408,082 | 4/1995 | Takagi et al. | 235/492 |
| 5,504,321 | 4/1996 | Sheldon | 235/492 |
| 5,517,014 | 5/1996 | Iijima | 235/492 |
| 5,544,246 | 8/1996 | Mandelbaum et al. | 705/65 |
| 5,576,951 | 11/1996 | Lockwood | 235/381 |
| 5,578,808 | 11/1996 | Taylor | 235/380 |
| 5,590,038 | 12/1996 | Pitroda | 235/380 |
| 5,684,742 | 11/1997 | Bublitz et al. | 365/189.01 |
| 5,724,520 | 3/1998 | Goheen | 705/5 |
| 5,732,398 | 3/1998 | Tagawa | 705/5 |
| 5,801,367 | 9/1998 | Asplund et al. | 235/384 |
| 5,802,519 | 9/1998 | De Jong | 707/100 |
| 5,832,454 | 11/1998 | Jafri et al. | 705/6 |
| 5,884,271 | 3/1999 | Pitroda | 705/1 |

FOREIGN PATENT DOCUMENTS

| | | |
|---|---|---|
| 0810538 | 12/1997 | European Pat. Off. . |
| 0 644 513 A2 | 9/1994 | United Kingdom . |
| 2 291 731 | 1/1996 | United Kingdom . |
| 2 298 505 | 9/1996 | United Kingdom . |
| WO 95/16245 | 6/1995 | WIPO . |
| WO 95/35546 | 12/1995 | WIPO . |

OTHER PUBLICATIONS

Schnabel, P. "A new high–security, multi–application smart card jointly developed by Bull and Philips." Smart Card 2000, selected papers from the Second International Smart Card 2000 Conference (Oct. 4–6, 1989). North–Holland, 1991, pp. 9–15.

Kutler, Jeffrey. "Amex proposes standards for virtual payments." American Banker. Dec. 3, 1997.

McNulty, Mary Ann. "Amex opens smart card files." Business Travel News. Dec. 8, 1997.

"Smart cards: Chemical Bank and AT&T Smart Cards from strategic alliance." Edge, on & about AT&T, vol. 8, No. 278, p. 33, Nov. 22, 1993.

"What's in the cards for smart cards?", Credit Card Management, vol. 8, No. 3, p. 64, Jun. 1995.

"International: Firms join Mondex in smart card consortium." Electronic Payments International, No. 120, p. 5, Jun. 1997.

Rankl, W. and W. Effing. "Smart Card Handbook." Chapter 7, "The Instruction Set—Section 7.8 File Management.." p. 217–219. John Wiley and Sons, 1995 (translated in 1997).

"Information technology—Identification cards—Integrated circuits(s) cards with contacts" *International Standard*, ISO/IEC 7816–4:1995(E).

"In your pocket: smartcards", *IEEE—Spectrum.*, Fancher, C.H., Feb. 1997, pp. 47–53.

*Primary Examiner*—Eric W. Stamber
*Assistant Examiner*—Michele Stuckey Crecca
*Attorney, Agent, or Firm*—Snell & Wilmer, L.L.P.

[57] ABSTRACT

Methods and apparatus for a smartcard system are provided which securely and conveniently integrate important travel-related applications. In one embodiment, a smartcard system includes a cardholder identification application and various additional applications useful in particular travel contexts; for example, airline, hotel, rental car, and payment-related applications. Furthermore, memory space and security features within specific applications provide partnering organizations (e.g., airlines, hotel chains, and rental car agencies) the ability to construct custom and secure file structures.

14 Claims, 9 Drawing Sheets

METHODS AND APPARATUS FOR A TRAVEL-RELATED MULTI-FUNCTION SMARTCARD

TECHNICAL FIELD

The present invention relates generally to the use of integrated circuit cards, or "smartcards," for commercial transactions and, more particularly, to methods and apparatus for conveniently storing, retrieving, and updating data related to a cardholder's travel information in the context of a distributed transaction system.

BACKGROUND ART AND TECHNICAL PROBLEMS

Despite advances in information technology and process streamlining with respect to travel arrangements, the modem traveler is often subjected to unnecessary delays, petty inconveniences, and oppressive paperwork. These travel burdens are most evident in the airline, hotel, and rental car industries, where arranging and paying for services and accommodations can involve significant time delays due to miscommunication, poor record-keeping, and a host of other administrative inefficiencies.

Smartcard technology, as described below, has had limited success in addressing some of these problems. The term "smartcard" refers generally to wallet-sized or smaller cards incorporating a microprocessor or microcontroller to store and manage data within the card. More complex than magnetic-stripe and stored-value cards, smartcards are characterized by sophisticated memory management and security features. A typical smartcard includes a microcontroller embedded within the card plastic which is electrically connected to an array of external contacts provided on the card exterior. A smartcard microcontroller generally includes an electrically-erasable and programmable read only memory (EEPROM) for storing user data, random access memory (RAM) for scratch storage, and read only memory (ROM) for storing the card operating system. Relatively simple microcontrollers are adequate to control these functions. Thus, it is not unusual for smartcards to utilize 8-bit, 5 MHZ microcontrollers with about 8K of EEPROM memory (for example, the Motorola 6805 or Intel 8051 microcontrollers).

A number of standards have been developed to address general aspects of integrated circuit cards, e.g.: *ISO* 7816-1, Part 1. *Physical characteristics* (1987); *ISO* 7816-2, Part 2: *Dimensions and location of the contacts* (1988); *ISO* 7816-3, Part 3: *Electronic signals and transmission protocols* (1989, Amd. 1 1992, Amd. 2 1994); *ISO* 7816-4, Part 4: *Inter-industry commands for interchange* (1995); *ISO* 7816-5, Part 5: *Numbering system and registration procedure for application identifiers* (1994, Amd. 1 1995); ISO/IEC DIS 7816-6, *Inter-industry data elements* (1995); *ISO/IEC WD* 7816-7, *Part 7: Enhanced inter-industry commands* (1995); and *ISO/IEC WD* 7816-8, Part 8: *Inter-industry security architecture* (1995). These standards are hereby incorporated by reference. Furthermore, general information regarding magnetic stripe cards and chip cards can be found in a number of standard texts, e.g., Zoreda & Oton, *SMART CARDS*(1994), and Rankl & Effing, *SMART CARDS HANDBOOK* (1997), the contents of which are hereby incorporated by reference.

Various attempts have been made to alleviate travel-related inconveniences through the use of smartcard technology. In 1995, for example, the U.S. airline industry led an effort to reduce ticket distribution costs by developing standards for "ticketless travel."Soon thereafter, a joint conference of IATA and ATA adopted a set of specifications entitled *Specifications for Airline Industry Integrated Circuit Cards* (hereinafter, "IATA standard"). Similarly, in the field of financial payment systems, a standard has been developed entitled *EMV Version 2.0, Integrated Circuit Card Specifications for Payment Systems, Parts* 1–3 (1995). Both of these specifications are hereby incorporated by reference.

Notwithstanding widespread promulgation of these standards, smartcard efforts tend to remain fragmented, and the resultant benefit to consumers—particularly consumers who travel—has been quite minimal. One recent study estimates that approximately nine million smartcards were issued in the transportation and travel industry in 1996, yet, for the most part, these cards remain incompatible; that is, due to differing file structures and/or communication protocols employed, card data typically can not easily be shared across applications or between industry participants.

Systems and methods are therefore needed in order to overcome these and other shortcomings in the prior art.

SUMMARY OF THE INVENTION

The present invention provides methods and apparatus for a smartcard system which securely and conveniently integrates important travel-related applications, thereby overcoming the limitations of the prior art. In accordance with one aspect of the present invention, a smartcard system comprises a cardholder identification application and various additional applications useful in particular travel contexts; for example, airline, hotel, rental car, and payment-related applications. In accordance with another aspect of the present invention, a smartcard system further comprises space and security features within specific applications which provide partnering organizations the ability to construct custom and secure file structures.

BRIEF DESCRIPTION OF THE DRAWING FIGURES

The present invention will hereinafter be described in conjuction with the appended drawing figures, wherein like numerals denote like elements, and:

Figure 4:
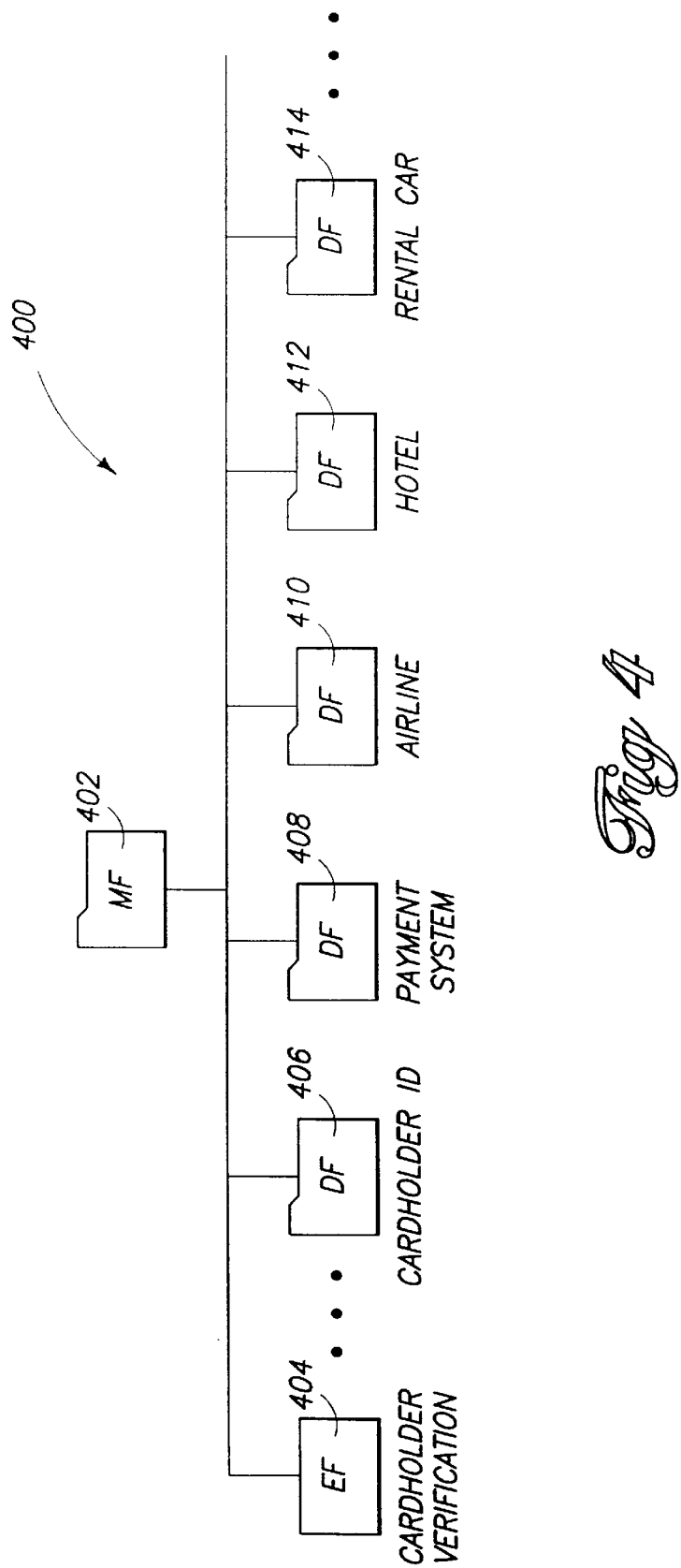
Figure 5:
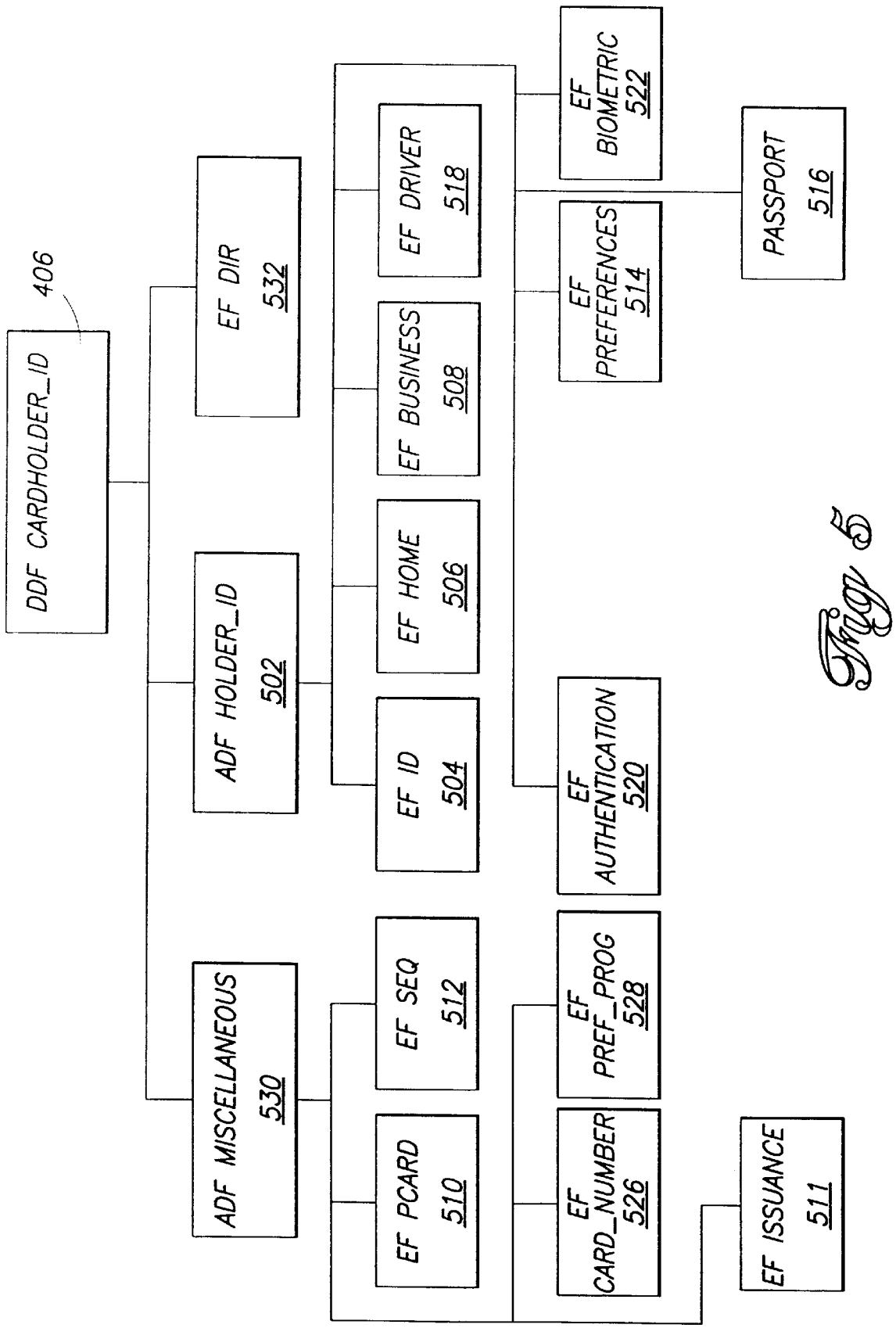
Figure 6:
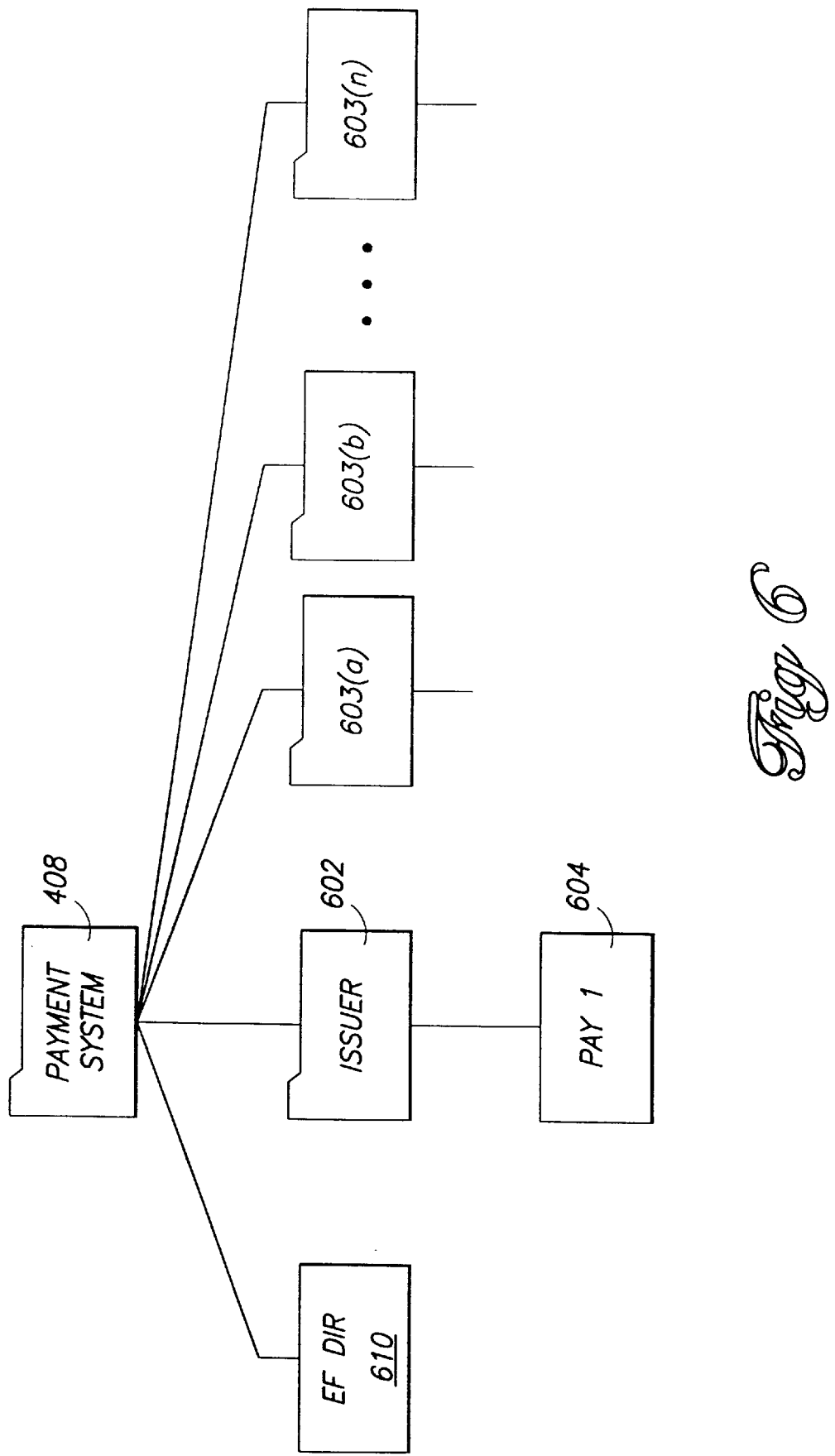
Figure 7:
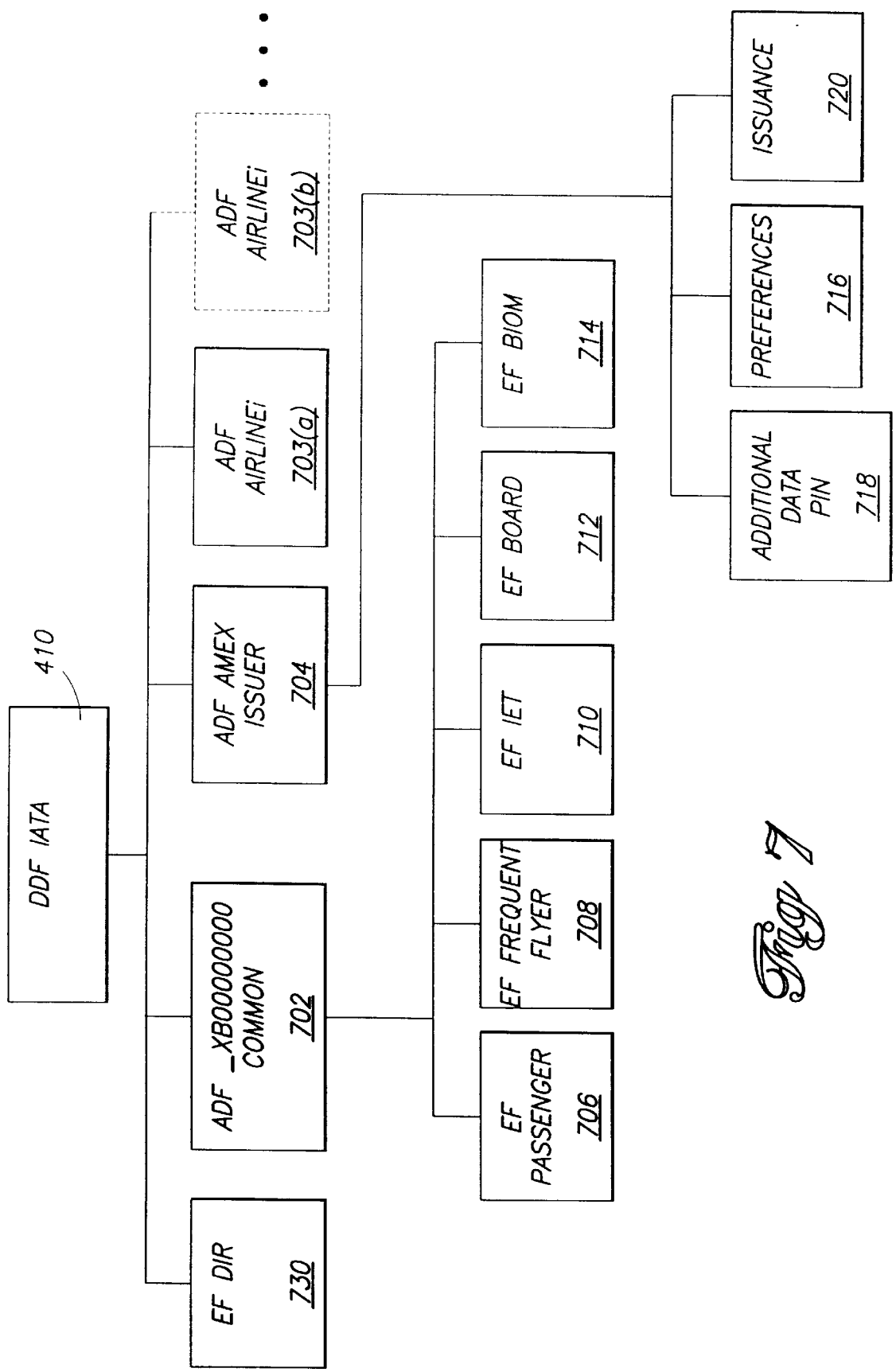
Figure 8:
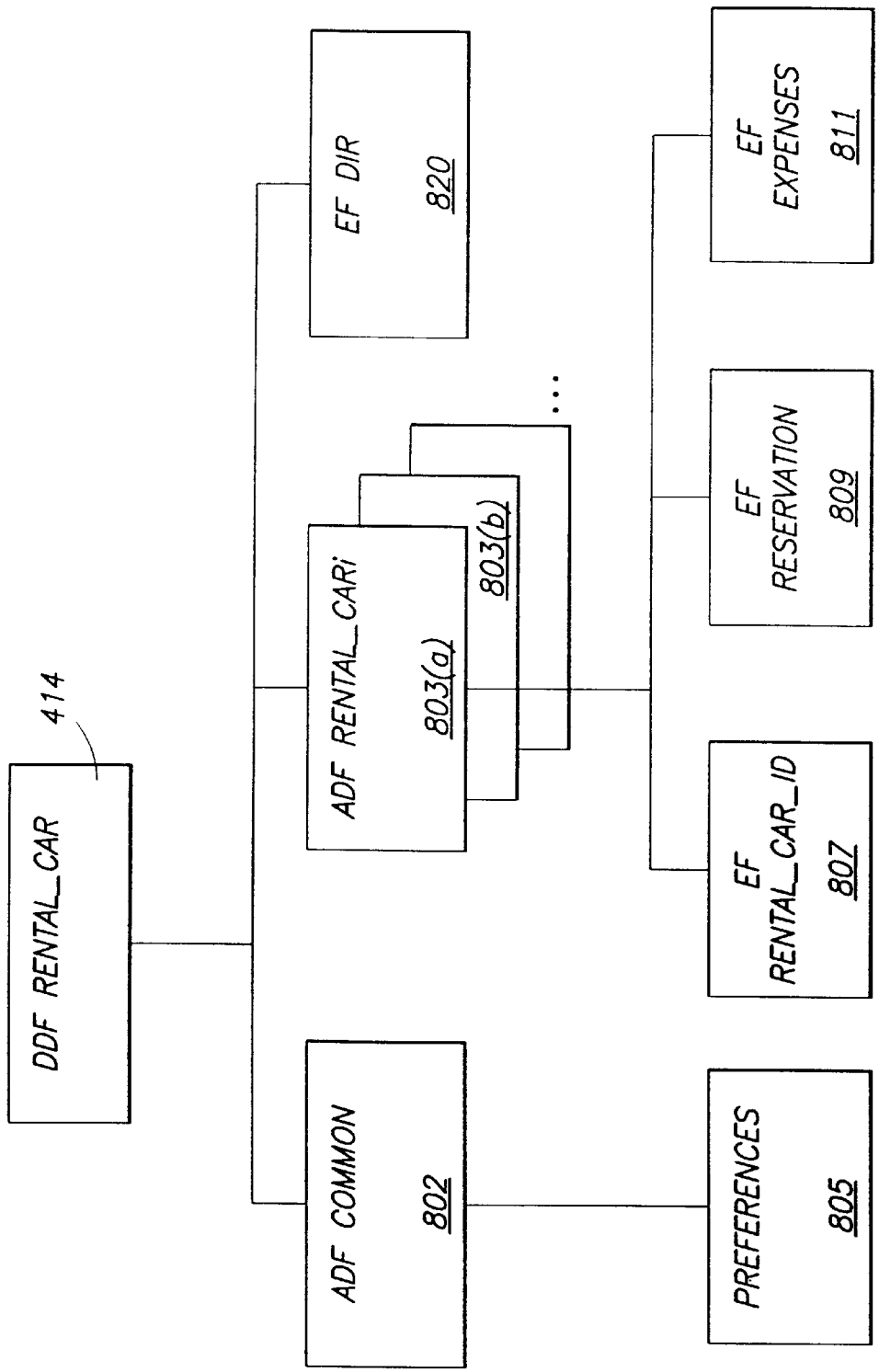
Figure 9:
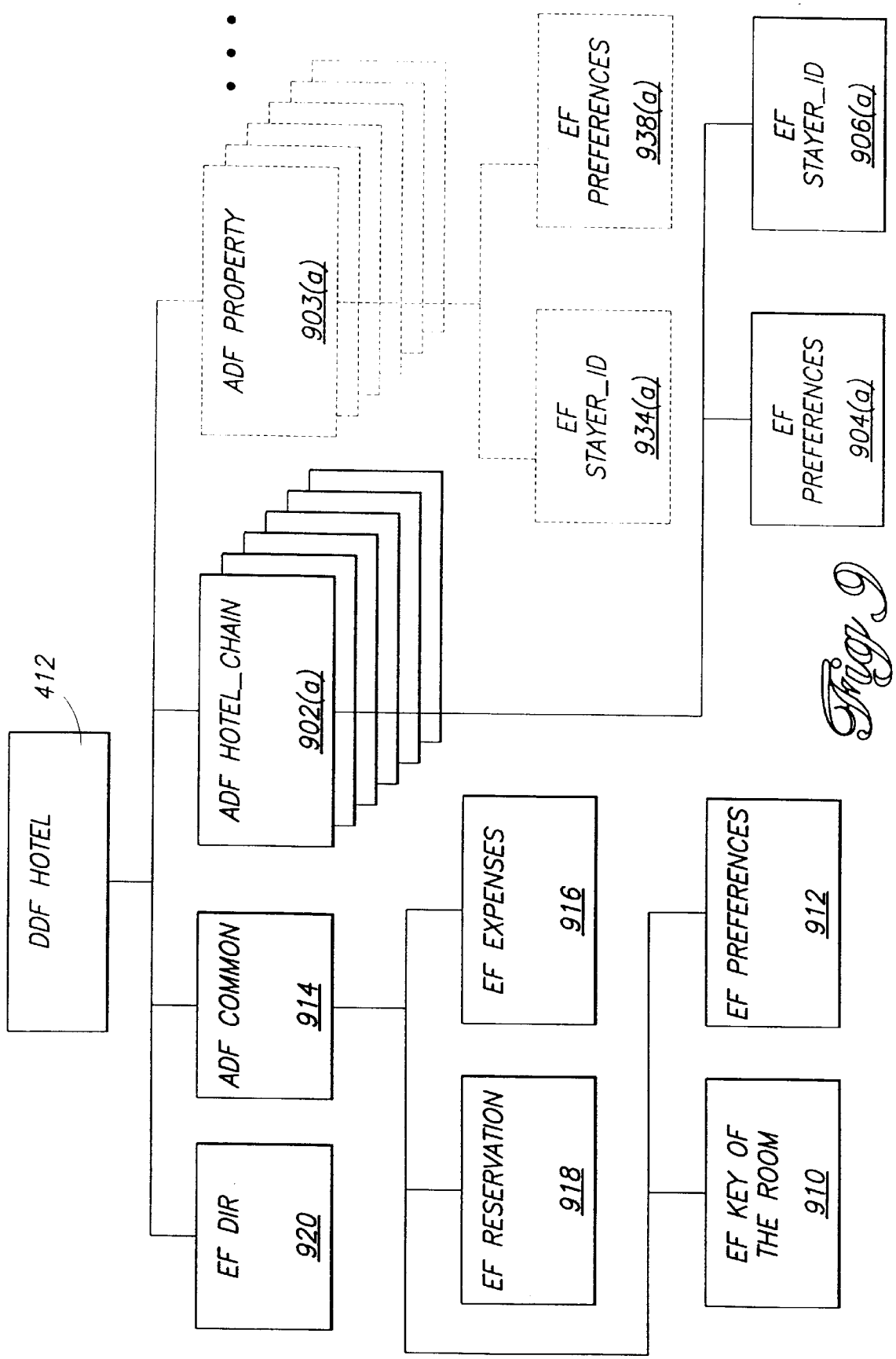
Figure 10:
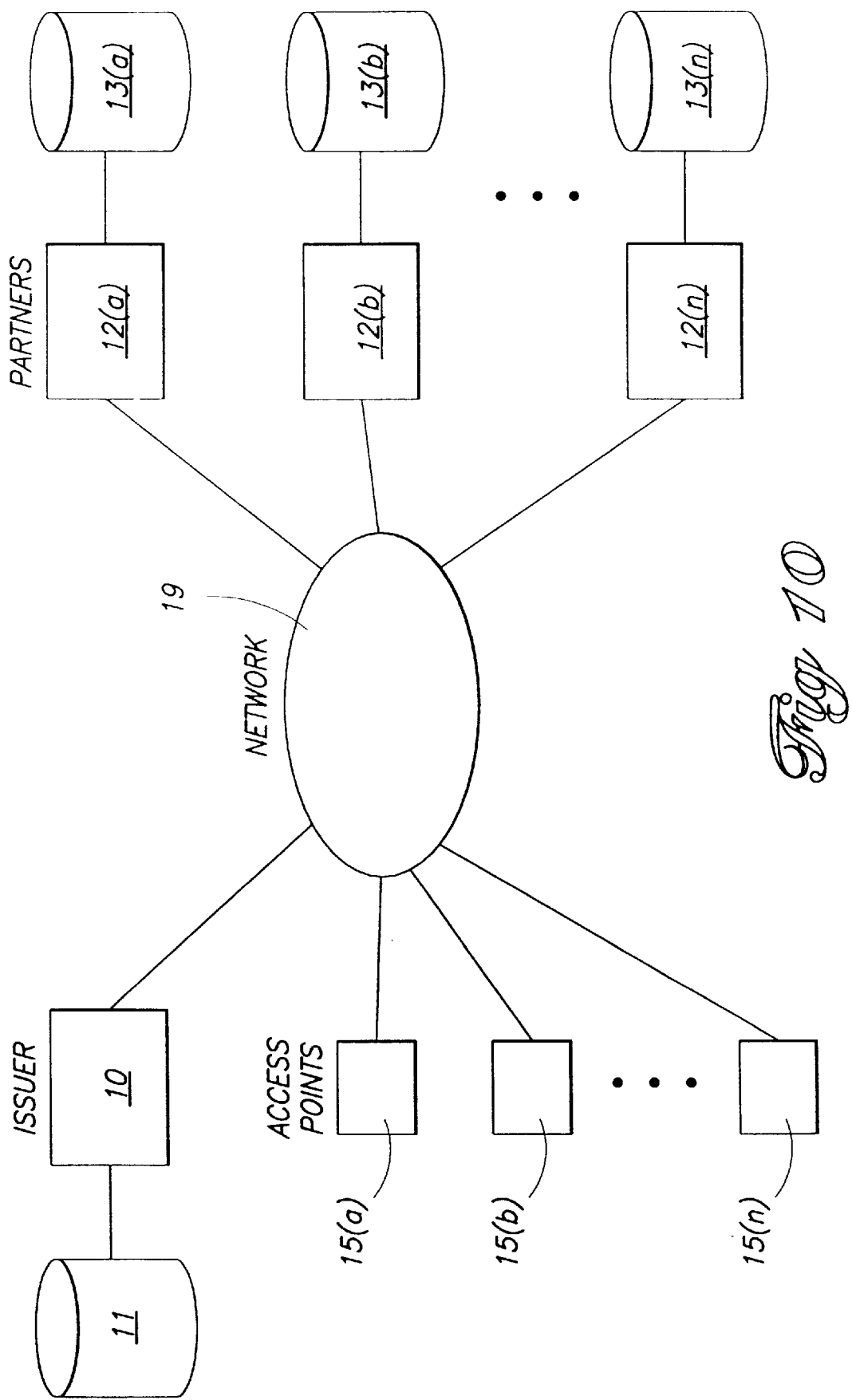

FIG. 4 sets forth an exemplary database structure in accordance with a preferred embodiment of the present invention;

FIG. 5 sets forth a preferred cardholder ID data structure in accordance with the present invention;

FIG. 6 sets forth a preferred payment system data structure in accordance with the present invention;

FIG. 7 sets forth a preferred airline data structure in accordance with the present invention;

FIG. 8 sets forth a preferred rental car data structure in accordance with the present invention;

FIG. 9 sets forth a preferred hotel system data structure in accordance with the present invention; and FIG. 10 illustrates an exemplary distributed transaction system useful in practicing the present invention.

DETAILED DESCRIPTION OF PREFERRED EXEMPLARY EMBODIMENTS

Figure 1:
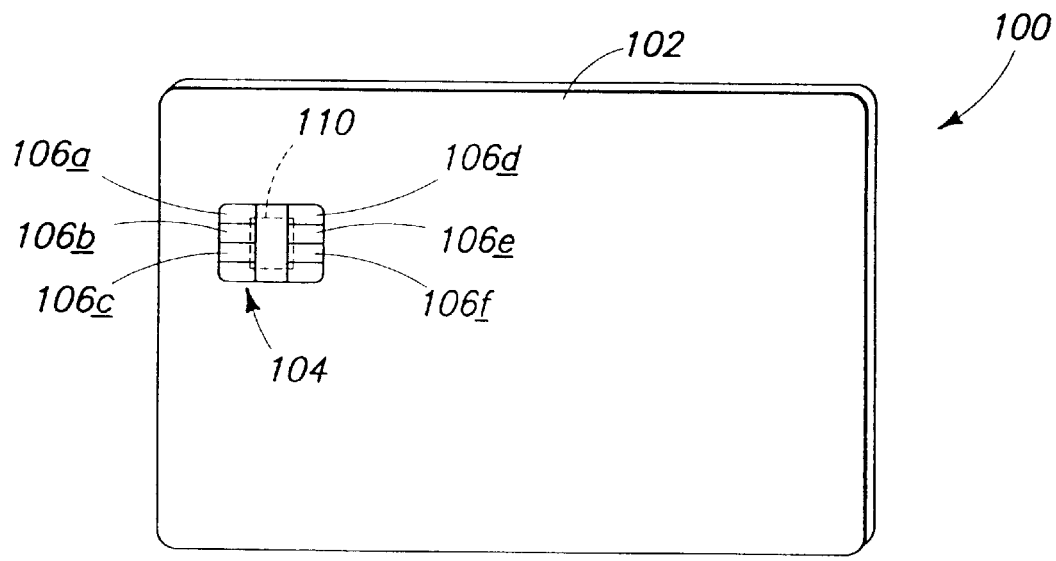
FIG. 1 illustrates an exemplary smartcard apparatus.
Figure 2:
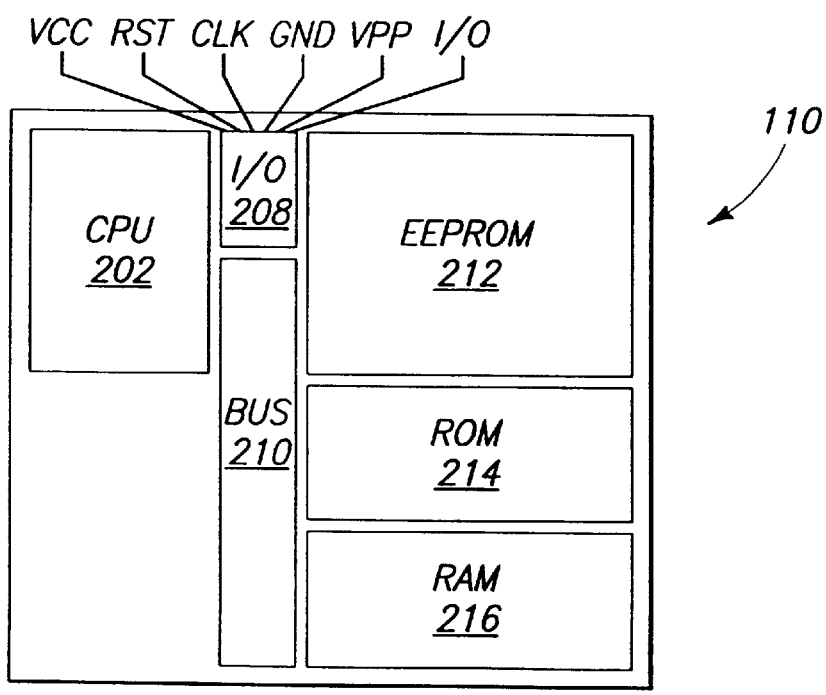
FIG. 2 is a schematic diagram of an exemplary smartcard integrated circuit, showing various functional blocks.

Referring now to FIGS. 1 and 2, an exemplary smartcard system suitable for practicing the present invention will now be described. A smartcard 100 generally comprises a card body 102 having a communication region 104 for providing contact or non-contact communication between an external device (e.g., a card reader) and an integrated circuit 110 encapsulated within card body 102. Communication region 104 preferably comprises six conductive pads 106 whose placement and size conform to ISO7816-2. More particularly, a communication region 104 in conformance with ISO-7816-2preferably comprises VCC contact 106(*a*) (power supply), RST contact 106(*b*) (reset), CLK contact 106(*c*) (external clock), GND Contact 106(*d*) (ground), VPP contact 106(*e*) (programming voltage), and I/O contact 106(*f*) (data line).

VCC 106(*a*) suitably provides power to IC 110 (typically 5.0 V +/−10%). CLK 106(*c*) is suitably used to provide an external clock source which acts as a data transmission reference. RST 106(*b*) is suitably used to transmit a reset signal to IC 110 during the booting sequence. VPP contact 106(*e*) may be used for programming of EEPROM 212 in IC 110. As is known in the art, however, this contact is generally not used since modern ICs typically incorporate a charge pump suitable for EEPROM programming which takes its power from the supply voltage (VCC 106(*a*)). I/O 106(*f*) suitably provides a line for serial data communication with an external device, and GND 106(*d*) is suitably used to provide a ground reference. Encapsulated integrated circuit 110 is configured to communicate electrically with contacts 106 via any number of known packaging techniques, including, for example, thermosonically-bonded gold wires, tape automated bonding (TAB), and the like.

While an exemplary smartcard is discussed above in the context of a plurality of external contacts, it will be appreciated that contactless cards may also be utilized to practice this invention. That is, non-contact communication methods may be employed using such techniques as capacitive coupling, inductive coupling, and the like. As is known in the art, capacitive coupling involves incorporating capacitive plates into the card body such that data transfer with a card reader is provided through symmetric pairs of coupled surfaces, wherein capacitance values are typically 10–50 picofarads, and the working range is typically less than one millimeter. Inductive coupling employs coupling elements, or conductive loops, disposed in a weakly-coupled transformer configuration employing phase, frequency, or amplitude modulation. In this regard, it will be appreciated that the location of communication region 104 disposed on or within card 100 may vary depending on card configuration. For additional information regarding non-contact techniques, see, for example, contactless card standards ISO/IEC 10536 and ISO/IEC 14443, which are hereby incorporated by reference.

Smartcard body 102 is preferably manufactured from a sufficiently rigid material which is resistant to various environmental factors, e.g., physical deterioration, thermal extremes, and ESD (electrostatic discharge). Materials suitable in the context of the present invention include, for example, PVC (polyvinyl chloride), ABS (acrylonitrile-butadiene-styrol), PET (polyethylene terephthalate), or the like. In a preferred embodiment, chip card 100 conforms to the mechanical requirements set forth in ISO 7810, 7813, and 7816. Body 102 may comprise a variety of shapes, for example, the rectangular ID-1, ID-00, or ID-000 dimensions set forth in ISO-7810. In a preferred embodiment, body 102 is roughly the size and shape of a common credit card and substantially conforms to the ID-1 specification.

Referring now to FIG. 2, IC 110 preferably comprises regions for Random Access Memory (RAM) 216, Read-Only Memory (ROM) 214, Central Processing Unit (CPU) 202, data bus 210, Input/Output (I/O) 208 and Electrically-Erasable and Programmable Read Only Memory (EEPROM) 212.

RAM 216 comprises volatile memory which is used by the card primarily for scratch memory, e.g., to store intermediate calculation results and data encryption processes. RAM 216 preferably comprises at least 256 bytes.

EEPROM 212 provides a non-volatile memory region which is erasable and rewritable electrically, and which is used to store, inter alia, user data, system data and application files. In the context of the present invention, EEPROM 212 is suitably used to store a plurality of files related to cardholder travel information (discussed in greater detail below in conjunction with FIG. 3). EEPROM 212 preferably comprises at least 8K bytes.

In a preferred embodiment, CPU 202 implements the instruction set stored in ROM 202, handles memory management (i.e., RAM 216 and EEPROM 212), and coordinates input/output activities (i.e., I/O 208).

ROM 214 preferably contains, or is "masked" with, the smart card operating system (SCOS). That is, the SCOS is preferably implemented as hard-wired logic in ROM 214 using standard mask design and semiconductor processing methods well known in the art (e.g., photolithography, diffusion, oxidation, ion implantation, etc.). Accordingly, ROM 214 cannot generally be altered after fabrication. The purpose of such an implementation is to take advantage of the fast access times provided by masked ROMs. ROM 214 suitably comprises about 4K–20K bytes of memory, preferably at least 16K bytes. In this regard, it will be appreciated that alternate memory devices may be used in place of ROM 214. Indeed, as semiconductor technology progresses, it may be advantageous to employ more compact forms of memory, for example, flash-EEPROMs.

The SCOS controls information flow to and from the card, and more particularly facilitates storage and retrieval of data stored within EEPROM 212. As with any operating system, the SCOS operates according to a well-defined command set. In this regard, a variety of known smart card operating systems are suitable for the purpose of this invention, for example, IBM's Multi-Function Card (MFC) Operating System 3.51, the specification of which is hereby incorporated by reference. While the IBM MFC operating system employs the standard tree structure of files and directories substantially in accordance with ISO7816-4 (as detailed below), it will be appreciated by those skilled in the art that other operating system models would be equally suitable for implementation of the present invention. Moreover, it may be advantageous to allow certain aspects of operating system functionality to exist outside the card, i.e., in the form of blocks of executable code which can be downloaded and executed by the smartcard during a transaction (for example, Java applets, ActiveX objects, and the like).

Given the general characteristics of smartcard 100 as outlined above, it will be apparent that a wide range of microcontrollers and contact-based smartcard products known in the art may be used to implement various embodiments of the present invention. Suitable smartcards include, for example, the model ST16SF48 card, manufactured by SGS-Thomson Microelectronics, which incorporates a Motorola 6805 microcontroller with 16K ROM, 8K EEPROM, and 384 bytes of RAM. It will be appreciated, however, that particular embodiments of the present invention might require more advanced microcontrollers with greater EEPROM capacity (i.e., in the range of about 12–16K). Such systems are well known in the art.

Having thus described an exemplary smartcard 100 and IC 110, an overview of a smartcard file structure in accordance with the present invention will now be described. Referring now to FIG. 4, file structure 400 is preferably used to store information related to card-holder preferences and various data useful for securing and paying for air travel, rental cars, hotel reservations and the like. More particularly, file structure 400 preferably comprises cardholder ID application 406, payment system application 408, airline application 410, hotel system application 412, rental car application 414, and cardholder verification data 404. It will be appreciated by those skilled in the art that the term "application" in this context refers to self-contained regions of data all directed at a particular function (e.g., airline, hotel, etc.) rather than a block of executable software code, although the use of executable modules as part of any particular application falls within the scope of the present invention.

Cardholder verification data 404 preferably houses data useful in verifying cardholder identity during a transaction. In a preferred embodiment, cardholder verification data 404 comprises two eight-byte cardholder verification numbers (i.e., PIN numbers) referred to as CHV1 and CHV2.

Cardholder ID application 406 suitably comprises various files related to personal information of the cardholder (e.g., name, addresses, payment cards, driver's license, personal preferences and the like). Cardholder ID application 406 is described in greater detail below in conjunction with FIG. 5.

Payment system application 408 suitably comprises information useful in effecting commercial transactions, e.g., account number and expiration date information traditionally stored on a magnetic-stripe credit card. Alternatively, Payment system application 408 comprises a full EMV-compliant application suitable for a wide range of financial transactions. Payment system application 408 is described further below in conjunction with FIG. 6.

Airline application 410 suitably comprises data helpful in streamlining commercial airline travel; for example, relevant personal preferences, electronic tickets, and frequent flier information. Airline application 410 is discussed in greater detail below in conjunction with FIG. 7.

Hotel application 412 suitably comprises information useful for securing and paying for hotel reservations, including an array of information and preferences associated with a list of preferred hotels as well space for electronic keys. Hotel application 412 is discussed in greater detail below in conjunction with FIG. 9.

Rental car application 414 suitably comprises data useful in expediting the process of car rental and return, including, for example, car preference and frequent rental information. Rental car application 414 is described in further detail below in conjunction with FIG. 8.

In each of the above mentioned applications, sophisticated access and encryption schemes are preferably utilized in order to allow multiple parties to make use of certain file structures while preventing unauthorized entry into others. More specifically, partnering organizations (e.g., hotel chains, airlines, and rental car agencies) may create their own tailor-made file structures (i.e., "partner file structures") within card 100. Details of the various security measures employed are described in further detail below in conjunction with Table 40.

Referring now to FIG. 10, smartcard 100 is suitably used in the context of a distributed transaction system. Briefly, cardholder's may employ smartcard 100 at various access points 15 which are connected via network 19 to an issuer 10 and at least one partnering organization 12. Issuer 10 suitably comprises various hardware and software components suitable for client host communications as well as a database system 11. In this context, the term 'issuer' refers to the organization that actually issues the smartcard and retains some high-level access to certain areas of file structure 400 (detailed below).

Partnering organizations 12(a), 12(b), and so on, comprise the various hotel chains, rental-car agencies, airlines, and the like, who have access to appropriate data regions within smartcard 100. Each partnering organization 12 suitably comprises a database 13 and appropriate hardware and software components necessary for completing a transaction over network 19. Network 19 may comprise one or more communication modes, e.g., the public switched telephone network (PSTN), the Internet, digital and analog wireless networks, and the like.

Each access point 15 suitably comprises an appropriate card reader for interfacing with smartcard 100 as well as hardware and software suitable for interfacing with a cardholder and performing a transaction over network 19. Access points 15 are preferably located in areas providing convenient access for traveling cardholder's or cardholder's preparing travel arrangements. Such access points 15 may be located, for example, in airline ticketing and gate areas, rental car facilities, hotel lobbies, travel agencies, and stand-alone kiosks in malls. In addition, businesses might see fit to host an access point 15 to streamline their employees' business travel. Furthermore, an individual cardholder might configure his or her personal computer to act as an access point using appropriate software and peripheral hardware.

Figure 3:
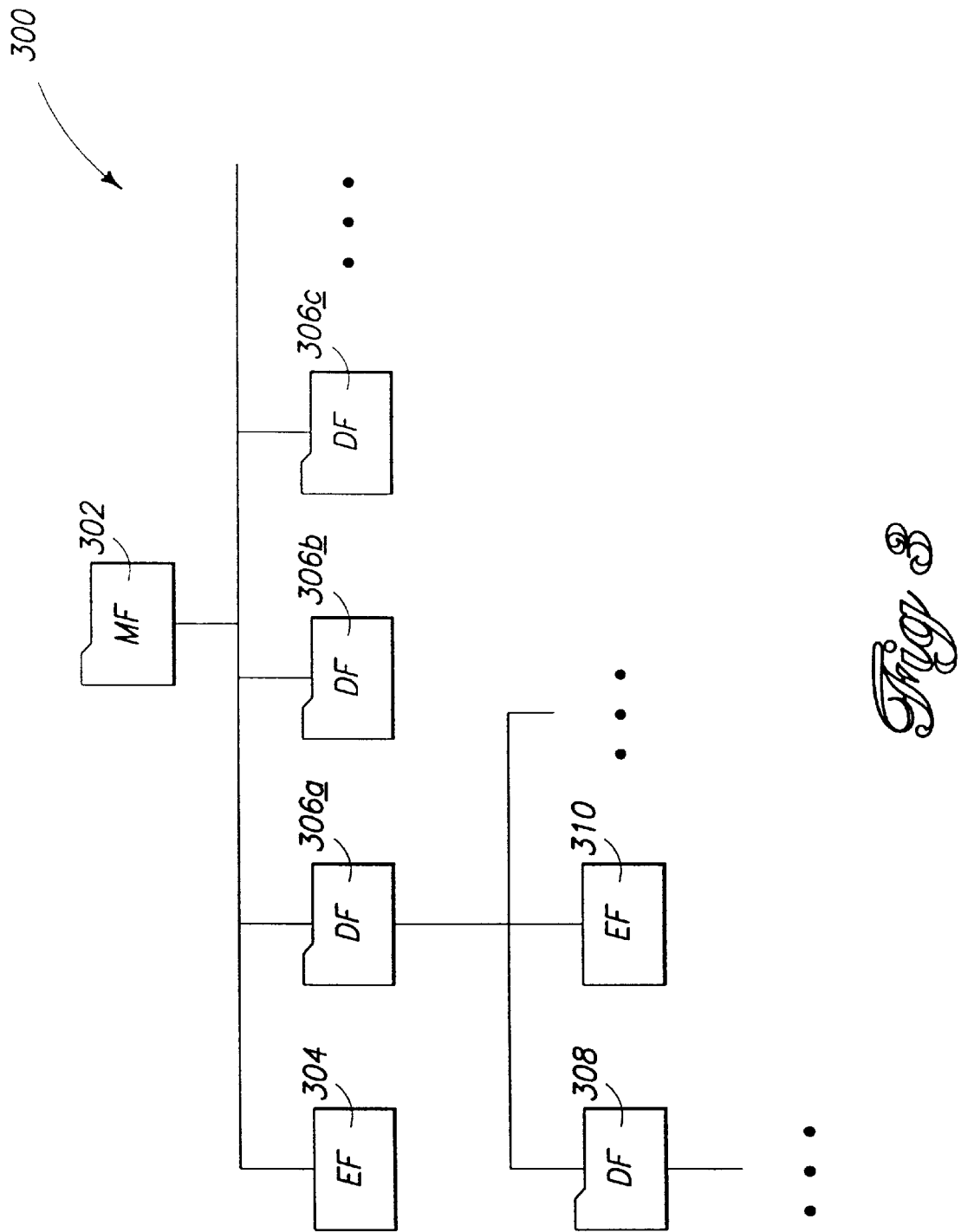
FIG. 3 is an examplary diagram of files and directories arranged in a typical tree structure.

In a preferred embodiment of the present invention, data files and directories are stored in a "tree" structure as illustrated in FIG. 3. That is, the smartcard file structure resembles the well known MS-DOS (Microsoft Disk Operating System) file structure wherein files are logically organized within a hierarchy of directories. Specifically, three types of files are defined in ISO 7816-4: dedicated files (DF), elementary files (EF), and a master file (MF). The master file is analogous to the MS-DOS "root" directory, and contains all other files and directories. Dedicated files are actually directories or "folders" for holding other DFs or EFs. Thus, MF 302 may contain an arbitrary number of DFs 306, and these DFs (e.g., DF 306(a)) may or may not contain other DFs (e.g., DF 308). Elementary files are used to store user data, and may exist within a dedicated file (e.g., EF 310 within DF 306(a)), or within the master file (e.g., EF 304 within MF 302). Higher level DFs (i.e., DFs which house particular applications) are often referred to as application dedicated files (ADFs).

The MF and each of the DFs and EFs are assigned a unique two-byte file identifier (FID). By convention, the MF is traditionally assigned an FID of '3F00' hex. Selection of an EF or DF by the operating system may then be performed by tracing its entire path starting at the MF. Thus, if the MF contains a DF with a FID 'A100 ', and this DF in turn contains an EF or DF by the operating system may then be performed by tracing its entire path successive selection of EIDs 3F00, A100, and A101. It will be appreciated that the FID is essentially a file name used by the operating system select directories and files; it is not intended to indicate a physical address within EEPROM 212. As will be appreciated by those skilled in the art, low-level EEPROM addressing is preferably handled by the SCOS in conjunction with CPU 202.

Each file preferably has as associated file leader containing various indicia of the particular EF, DF, or MF. More particularly, the file header associated with a particular file preferably includes the file identifier (FID), file size, access conditions, and file structure. In this regard, smartcard 100 suitably employs one of four file structures: transparent, linear fixed, linear variable, or cyclic. For the sake of completeness, the nature of these file structures will be briefly reviewed.

A transparent file structure consists of a string of bytes accessed by specifying an offset and byte count. For example, with reference to Table 1 below, given a n-byte string of data, bytes 7 through 10 would be accessed using an offset of six and a length of four.

TABLE 1

Transparent file structure byte#

1 2 3 4 5 6 7 8 9 10 11 12 13 14 ... ... n

⎯⎯⎯⎯⎯ offset ⎯⎯⎯► ◄⎯⎯ length ⎯⎯►

A linear fixed file structure comprises a plurality of records of equal length (e.g., a list of phone numbers), wherein access to an individual record is achieved through reference to a record number. In addition, it is possible to refer to the 'next' or 'previous' record relative to the 'current' record (i.e., the most recently accessed record). In contrast, a linear variable file structure comprises records of arbitrary but known length, and is therefore typically more compact than linear fixed data structures.

A cyclic file structure is a type of linear fixed file wherein a pointer is used to point to the last data set written to. After the last data record is written to, the pointer returns to the first record. That is, a cyclic file comprises a series of records arranged in a 'ring'.

A data structure particularly important with regard to storing records as well as secure messaging in smartcard applications is the BER tag-length-value or "TLV" structure in accordance with ISO/IEC 8825, hereby incorporated by reference. In a TLV object, information regarding the type and length of the information is included along with the actual data. Thus, a TLV object comprises a tag which identifies the type of data (as called out by the appropriate specification), a length field which indicates the length in bytes of the data to follow, and a value field, which comprises the primary data. For example, the TLV object illustrated in Table 2 below encodes the text "phoenix", which has a length of 7 bytes, and corresponds to a the "city" tag of '8C' hex (a hypothetical tag designation).

TABLE 2

Exemplary primitive TLV object

| Tag | Length | Value |
|-----|--------|-------|
| '8C' | '07' | p h o e n i x |

It will be appreciated that the meaning of the various tag values must be known to the system a priori. That is, in order for the tag field to be useful, the smartcard and any external systems communicating with the smartcard must conform to the same tag specification. In this regard, ISO/IEC 7816-6 defines a series of tags useful in the context of the present invention, as does the IBM MFC 3.2 specification. ISO/IEC 8825 sets forth the basic encoding rules for a TLV system and defines a "template" data object which can be used as a container for multiple TLV objects. That is, it is often advantageous to encapsulate primitive TLV objects within a larger template which is itself a TLV object.

Referring now to FIG. 4, a preferred smartcard data structure in accordance with the present invention will now be described in detail. Data structure 400 preferably comprises a MF 402 and five DFs: Cardholder ID application 406, Payment system application 408, Airline application 410, Hotel application 412, and Rental car application 414.

In the detailed description to follow, various acronyms and abbreviations will be used to refer to particular data types, formats, and the like. A key to these acronyms and abbreviations is presented in Table 3 below.

TABLE 3

Key to acronyms

| | |
|---|---|
| AN | Alphanumeric |
| N | Numeric |
| B | Boolean |
| C | Convention |
| M | Matrix |
| D | Data |
| AR | Bits array |
| BIN | Binary |
| RJ | Right-justified |
| LJ | Left-justified |
| BCD | Binary coded decimal |

In the discussion that follows, the various features of a preferred data structure are in some cases described using particular file structure types (i.e., transparent, fixed, etc.). Those skilled in the art will realize, however, that any of the common smartcard file structure types are typically suitable for implementing any particular data structure. For example, when a file structure is described as including "a plurality of records," it will be understood that such a structure may be designed, for example, using a list of records assembled in a linear fixed file wherein each record is itself a transparent file (and offset values correspond to the various fields). Alternatively, such a structure may be designed using TLV strings assembled in a linear fixed file or within a larger template TLV. This is the case notwithstanding the fact that particular tag values—which are for the most part arbitrary—are not explicitly listed in the tables that follow.

Cardholder ID Application

Referring now to FIG. 5, Cardholder ID application 406 is used to store various information related to the cardholder. Portions of this information are freely available to the partnering organizations, thereby preventing the storage of redundant information.

More particularly, cardholder ID application 406 preferably comprises directory EF 532, holder_ID DF 502 and miscellaneous DF 530. Holder_ID DF 502 preferably comprises ID EF 504, home EF 506, business EF 508, preferences EF 514, passport EF 516, authentication EF 520, biometric EF 522, and driver EF 518. Miscellaneous EF 530 preferably comprises payment card EF 510, sequence EF 512, issuance EF 511, preferred programs EF 528, and card number EF 526. These files and their respective functions are discussed in detail below.

Directory EF 532 provides a list of application identifiers and labels for the various high-level DF's existing under cardholder ID application 406. That is, this file serves the function of a high-level directory listing which specifies the location (i.e., FID) and application label for each DF—in this case, holder_ID DF 502 and miscellaneous DF 530. In a particularly preferred embodiment, directory EF 532 is structured in accordance with EMV 3.0 as shown in Table 4 below. Preferably, each major application (e.g., hotel, airline, etc.) has an associated directory file with a substantially same file structure.

TABLE 4

Exemplary cardholder ID directory EF

| Record description | External format | | Internal format (bytes) | |
|---|---|---|---|---|
| | Size | Type | Size | Type |
| Application ID for holder_ID DF | 16 | AN | 16 | ASCII |
| Application label | 16 | AN | 16 | ASCII |
| Application ID for miscellaneous DF | 16 | AN | 16 | ASCII |
| Application label | 16 | AN | 16 | ASCII |

ID EF 504 preferably includes personal information related to the cardholder, e.g., name, date of birth, emergency contact, general preferences, and the like. In a particularly preferred embodiment, member EF 504 comprises the fields set forth in Table 5 below. Italicized field names indicate a subcategory within a particular field.

TABLE 5

Exemplary ID EF data structure

| Record description | External format | | Internal format (bytes) | |
|---|---|---|---|---|
| | Size | Type | Size | Type |
| Last Name | 30 | AN | 30 | ASCII |
| First Name | 20 | AN | 20 | ASCII |
| Middle Name | 8 | AN | 8 | ASCII |
| Honorary Title | 8 | AN | 8 | ASCII |
| Name Suffix | 4 | AN | 4 | ASCII |
| Date of Birth | 8 | D | 4 | BCD |
| Social Security Number | 10 | AN | 10 | ASCII |
| Emergency Contact | | | | |
| Last Name | 20 | AN | 20 | ASCII |
| First Name | 10 | AN | 10 | ASCII |
| Relation | 1 | C | 1 | BIN |
| Phone | 20 | N | 10 | BCD |
| Gender | 1 | AN | 1 | ASCII |
| Special Person Requirements | 12 | AN | 12 | M |
| Language Preference (ISO 639) | 2 | C | 2 | ASCII |

In the above table, and the tables to follow, both internal and external data formats are listed. As the conservation of EEPROM space is of paramount importance, the "internal" format of data (i.e., within EEPROM 212) may be different from the "external" format of the data (i.e., as read by the card reader at an access point 15). Thus, for example, a date field might consist of a four-byte BCD record within the card, but upon reading and processing by the terminal, this data might be converted to an eight-byte decimal value for more convenient processing.

Home EF 506 preferably includes data related to one or more of the cardholder's home addresses. In a particularly preferred embodiment, home EF 506 comprising the fields set forth in Table 6 below. The personal travel charge account pointer is preferably used to designate a preferred payment card, and consists of a number corresponding to one of the payment card records within payment card EF 510 (detailed below).

TABLE 6

Exemplary home EF file structure

| Record description | External format | | Internal format (bytes) | |
|---|---|---|---|---|
| | Size | Type | Size | Type |
| Home Address 1 | 40 | AN | 40 | ASCII |
| Home Address 2 | 40 | AN | 40 | ASCII |
| Home Address City | 25 | AN | 25 | ASCII |
| Home Address State | 5 | AN | 5 | ASCII |
| Home Country (TSO 3166) | 2 | AN | 2 | ASCII |
| Home Address Zip Code | 10 | AN | 10 | ASCII |
| Home Address Telephone | 20 | N | 10 | BCD |
| Home Address FAX | 20 | N | 10 | BCD |
| Home E-mail address | 40 | AN | 40 | ASCII |
| Personal travel charge account number pointer | 2 | N | 1 | BCD |

Business EF 508 preferably includes various data related to the cardholder's business (i.e., addresses, phone numbers, and the like). In a particularly preferred embodiment, business EF 508 comprising the fields set forth in Table 7 below. In this regard, the credit card pointer field is preferably used to point to a payment card record within payment card EF 510 (detailed below). The cost center, dept., division, and employee ID fields are employer-specific, and may or may not apply in a given case.

TABLE 7

Exemplary business EF file structure

| Record description | External format | | Internal format (bytes) | |
|---|---|---|---|---|
| | Size | Type | Size | Type |
| Business Address 1 | 40 | AN | 40 | ACSII |
| Business Address 2 | 40 | AN | 40 | ASCII |
| Business Address City | 25 | AN | 25 | ASCII |
| Business Address State | 5 | AN | 5 | ASCII |
| Business Country (ISO 3166) | 2 | AN | 2 | ASCII |
| Business Address Zip Code | 10 | AN | 10 | ASCII |
| Business Telephone No. | 20 | N | 10 | BCD |
| Business Address Fax | 20 | N | 10 | BCD |
| Business E-mail Address | 40 | AN | 40 | ASCII |
| Professional Title | 10 | AN | 10 | ASCII |
| Employee ID | 10 | AN | 10 | ASCII |
| Division | 20 | AN | 20 | ASCII |
| Dept | 20 | AN | 20 | ASCII |
| Cost Center | 12 | AN | 12 | ASCII |
| Professional travel account number pointer | 2 | N | 2 | BCD |
| Professional license data | 20 | AN | 20 | ASCII |
| Credit Card pointer | 2 | N | 1 | BCD |
| Company Name | 20 | AN | 20 | ASCII |

Preferences EF 514 preferably comprises data related to the cardholder's default personal preferences. In a particularly preferred embodiment, preferences EF 514 includes a field comprising an array of preferences as set forth in Table 8 below. Preference values are preferably chosen from a list of preference tags as set forth in Table 39.

TABLE 8

Examplary preferences EF file structure

| Record description | External format | | Internal format (bytes) | |
|---|---|---|---|---|
| | Size | Type | Size | Type |
| Preferences Array | 20 | C | 20 | C |

Passport EF 516 is preferably used to store cardholder passport information. In a particularly preferred embodiment, passport EF 516 comprises the fields set forth in Table 9 below.

TABLE 9

Examplary passport EF file structure

| Record description | External format | | Internal format (bytes) | |
|---|---|---|---|---|
| | Size | Type | Size | Type |
| Passport Number | 20 | AN | 20 | ASCII |
| Passport Country -- ISO 3166 | 2 | AN | 2 | ASCII |
| Issuance Date | 8 | D | 4 | BCD |
| City of Issuance | 20 | AN | 20 | AN |
| Expiration Date | 8 | D | 4 | BCD |

Driver EF 516 preferably comprises cardholder driver license data. In a particularly preferred embodiment, driver EF 518 comprising the fields set forth in Table 10 below.

TABLE 10

Exemplary driver EF file structure

| Record description | External format | | Internal format (bytes) | |
|---|---|---|---|---|
| | Size | Type | Size | Type |
| Driver's License No. | 20 | a | 20 | ASCII |
| Driver's License Issuing State/Country | 2 | a | 2 | BCD |
| License Expiration Date | 8 | D | 4 | ASCII |
| License Type | 2 | C | 4 | BCD |

Biometric EF 522 is used to store biometric data (preferably encoded) such as fingerprint data, retina scan data, or any other sufficiently unique indicia the cardholder's physical or behavioral characteristics. In a particularly preferred embodiment, biometric EF 522 comprises a single data string as set forth in Table 11 below.

TABLE 11

Exemplary biometric EF file structure

| Record description | External format | | Internal format (bytes) | |
|---|---|---|---|---|
| | Size | Type | Size | Type |
| Biometrics template | 100 | AN | 100 | BIN |

Authentication EF 520 preferably comprises information for static authentication of the cardholder ID 406 application. This data is unique for each card, and is sufficiently complex such that counterfeit values cannot feasibly be created. This prevents creation of "new" counterfeit cards (i.e., cards with new authentication data), but does not prevent creation of multiple copies of the current card.

In a particularly preferred embodiment, authentication EF 520 includes public key certificate fields as shown in Table 12 below, wherein the external format is identical to the internal format. Preferably, the issuer RSA key is 640 bits long, and the CA key is 768 bits long.

TABLE 12

Exemplary authentication EF

| Record description | Internal format (bytes) | |
|---|---|---|
| | Size | Type |
| Signed Static Application Data | 80 | B |
| Static Data Authentication Tag List | 16 | B |
| Issuer Public Key Certificate | 96 | B |
| Issuer Public Key Exponent | 1 | B |
| Issuer Public Key Remainder | 20 | B |

Turning now to files under miscellaneous DF 530, preferred programs EF 528 preferably comprises data related to the cardholder's preferences as to airline companies, hotels, and rental car agencies. Specifically, this EF, in a particularly preferred embodiment, comprises a plurality of records (e.g., three) indicating preferred companies for each type of travel partner as shown in Table 13. The actual data values conform to an arbitrary convention; that is, each airline, hotel, and rental car agency is assigned an arbitrary three-byte code.

TABLE 13

Exemplary programs EF

| Record description | External format | | Internal format (bytes) | |
|---|---|---|---|---|
| | Size | Type | Size | Type |
| Preferred Airlines | 9 (3 × 3) | C | 9 | C |
| Preferred Hotels | 9 | C | 9 | C |
| Preferred Rental Cars | 9 | C | 9 | C |

Payment card EF 510 is preferably used to catalog information related to the cardholder's various payment cards, i.e., debit cards, charge cards, and the like. In a particularly preferred embodiment, payment card EF comprises card numbers and expiration dates for two cards as shown in Table 14. The "ISO" and "non-ISO" designations refer to ISO-7813, which specifies a particular payment card number format. Thus, in a preferred embodiment, either an ISO or non-ISO card number scheme may be used. Moreover, it will be appreciated that this data set is sufficient only for "card not present" transactions, for example, transactions taking place remotely where only the card number and expiration date are required to effect a transaction. Data stored within payment system application 408 (described below) must be used to effect a "card present" transaction.

TABLE 14

Exemplary payment card EF file structure

| Record description | External format | | Internal format (bytes) | |
|---|---|---|---|---|
| | Size | Type | Size | Type |
| First Payment Card # (ISO) | 19 | N | 10 | BCD |
| First Payment Card Expiration Date | 8 | D | 4 | BCD |
| Second Payment Card # (non-ISO) | 20 | AN | 20 | ASCII |
| Second Payment Card Expiration Date | 8 | D | 4 | BCD |

Sequence EF 512 preferably includes information used to provide synchronization of the host and smartcard databases. In a particularly preferred embodiment, sequence EF 512 comprises a plurality of records comprising the field set forth in Table 15 below. This number is analogous to a "version" number for the data stored in the application.

TABLE 15

Exemplary sequence EF file structure

| | External format | | Internal format (bytes) | |
|---|---|---|---|---|
| Record description | Size | Type | Size | Type |
| Sequence Number | 16 | AN | 16 | ASCII |

Card number EF 526 is used to record a unique number identifying the smartcard, and may also be used for key derivation (as described in further detail below). Preferably, card number EF 526 comprises a eight-byte string as set forth in Table 16 below.

TABLE 16

Exemplary card number EF

| | External format | | Internal format (bytes) | |
|---|---|---|---|---|
| Record description | Size | Type | Size | Type |
| Card Number | 8 | HEX | 8 | HEX |

Issuance EF 511 is used to record various details related to the manner in which the application (i.e., cardholder ID DF 406) was created. This file includes information related to the identity of the organization that created the application, as well as information related to the application itself. In a particularly preferred embodiment, issuance EF 511 comprises fields as set forth in Table 17 below.

TABLE 17

Exemplary issuance EF file structure

| | External format | | Internal format (bytes) | |
|---|---|---|---|---|
| Field | Size | Type | Size | Type |
| Country Authority | | ISO 3166 | 2 | |
| Issuer Authority | 10 | RID - ISO 7816-5 | 5 | HEX |
| Application version | 5 | XX.YY | 2 | BCD |
| Application expiration date | 8 | YYYYMMDD | 4 | BCD |
| Application effective date | 8 | YYYYMMDD | 4 | BCD |
| Personalizer Code | 1 | AN | 1 | ASCII |
| Personalization Location | 1 | AN | 1 | ASCII |

The personalizer code field shown in Table 17 refers to the organization that actually "personalizes" the file. That is, before a smartcard may be issued to the cardholder, the database structure must be created within EEPROM 212 (FIG. 2), and the initial data values (i.e., default preferences, cardholder name, pin numbers, etc.) must be placed in the appropriate fields within the various EFs. It will be appreciated that, given the nature of the present invention, the smartcard "issuer" and "personalizer" for any given application may not be the same. Therefore, it is advantageous to record various details of the personalization process within smartcard 100 itself. Similar issuance file structures may be provided for the other major applications.

Payment System Application

Referring now to FIG. 6, payment system application 408 preferably comprises a directory EF 610, issuer DF 602, and a number of optional DFs 603(a)–(n) for use by partnering financial organizations.

Directory EF 610 preferably includes a list of application identifiers and labels as described above in the context of cardholder ID application 406.

Issuer DF 602 comprises pay1 DF 604, which includes data that would traditionally be stored within tracks on a magnetic stripe card (i.e., debit cards, charge cards, and the like). In a preferred exemplary embodiment, pay1 DF 604 comprises a plurality of records having commonly known magnetic-stripe fields as specified in Table 18 below.

TABLE 18

Exemplary Pay1 EF file structure

| | External format | | Internal format (bytes) | |
|---|---|---|---|---|
| Record description | Size | Type | Size | Type |
| Format Code (Track 1) | 1 | AN | 1 | ASCII |
| PAN (Track 2) | 15 | N | 8 | BCDF right padding |
| Expiration date (Track 1 or 2) | 4 | YYMM | 2 | BCD |
| Effective date (Track 1 or 2) | 4 | YYMM | 2 | BCD |
| Discretionary data (Track 1 or 2) | 5 | N | 3 | BCDF right padding |
| Name (Track 1) | 26 | AN | 26 | ASCII, LJ blank padding |

Airline Application

Referring now to FIG. 7, airline application 410 preferably comprises directory EF 730, common DF 702, and issuer DF 704, and additional airline applications 703(a), 703(b), and so on.

Directory EF 730 preferably includes a list of application identifiers and labels as described above in the context of cardholder ID application 406.

Common DF 702 generally includes data accessible to all participating airlines, while issuer DF 704 generally includes data which can only be read or written to by the smartcard issuer. Airline application 410 preferably further comprises at least one (preferably three) additional DF 703 for use by airline partnering organizations. That is, one airline partner may have access to and specify the structure of data stored within DF 703(a) (as well as common EF 702), while another airline might have similar access to DF 703(b). These partner DFs preferably conform to the relevant portions of the IATA specification.

Common DF 702 suitably comprises common data which would be of use to any of the various partnering airlines, i.e., passenger EF 706, frequent flier EF 708, IET EF 710, boarding EF 712, and biometric EF 714.

Issuer DF 704, in contrast, comprises information readable by all, but updatable only by the card issuer, i.e., preferences EF 716, PIN EF 718, and issuance EF 720.

Referring now to information stored within common EF 702, passenger EF 706 preferably comprises various records related to the passenger as specified in Table 19 below.

TABLE 19

Exemplary passenger EF file structure

| Record description | External format | | Internal format (bytes) | |
|---|---|---|---|---|
| | Size | Type | Size | Type |
| Passenger Name | 49 | AN | 49 | ASCII |
| Gender | 1 | A | 1 | BIN |
| Language Preference | 2 | AN | 2 | ASCII |
| Unique ID | 24 | AN | 24 | ASCII |
| Airline ID (3 letters code) | 3 | AN | 3 | ASCII |
| Type code (2 letters) | 2 | AN | 2 | ASCII |
| Unique ID | 19 | AN | 19 | ASCII |
| Application version | 2 | N | 2 | BIN |

In a particularly preferred embodiment, frequent flyer EF 708 comprises a plurality of frequent flier numbers (e.g., ten numbers) having the structure specified in Table 20 below.

TABLE 20

Exemplary frequent flyer EF file structure

| Record description | External format | | Internal format (bytes) | |
|---|---|---|---|---|
| | Size | Type | Size | Type |
| Airline Customer ID | 22 | AN | 22 | ASCII |

IET EF 710 preferably comprises a plurality of electronic ticket records as set forth in Table 21 below. The format of these electronic tickets preferably conforms to the IATA standard.

TABLE 21

Exemplary IET file structure

| Description of the records | External format | | Internal format (bytes) | |
|---|---|---|---|---|
| | Size | Type | Size | Type |
| IET 1 | 14 | AN | 14 | BIN |
| IET 2 | 14 | AN | 14 | BIN |
| IET 3 | 14 | AN | 14 | BIN |
| IET 4 | 14 | AN | 14 | BIN |
| IET 5 | 14 | AN | 14 | BIN |

In a particularly preferred embodiment, boarding EF 712 comprises boarding data to be used during check in as specified in Table 22. The format of this data preferably conforms to the IATA specification.

TABLE 22

Exemplary boarding EF file structure

| Record description | External format | | Internal format (bytes) | |
|---|---|---|---|---|
| | Size | Type | Size | Type |
| Boarding data | 40 | AN | 40 | ASCII |

Biometric EF 714 is suitably used to store biometric data associated with the cardholder, e.g., retina scan data, fingerprint data, or any other sufficiently unique indicia of the cardholder's physical or behavioral characteristics. In a particularly preferred embodiment, biometric EF 714 comprises data as specified in Table 23 below.

TABLE 23

Exemplary biometric EF file structure

| Record description | External format | | Internal format (bytes) | |
|---|---|---|---|---|
| | Size | Type | Size | Type |
| Biometrics data | 100 | AN | 100 | BIN |

Issuance EF 720 is suitably used to hold data related to the issuance of the various applications. In a particularly preferred embodiment, issuance EF 720 comprises a data structure as specified in Table 24 below.

TABLE 24

Exemplary issuance EF file structure

| Field | External format | | Internal format (bytes) | |
|---|---|---|---|---|
| | Size | Type | Size | Type |
| Country Authority (2 letters) | | ISO 3166 | 2 | |
| Issuer Authority | 10 | RID - ISO 7816-5 | 5 | HEX |
| Application version | 5 | XX.YY | 2 | BCD |
| Application expiration date | 8 | YYYYMMDD | 4 | BCD |
| Application effective date | 8 | YYYYMMDD | 4 | BCD |
| Personalizer Code | 1 | AN | 1 | ASCII |
| Personalization Location (custom code) | 1 | AN | 1 | ASCII |

PIN EF 718 is suitably used to store PIN values corresponding to each of the participating airline partners. In a particularly preferred embodiment, PIN EF 718 comprises a plurality of records having the structure specified in Table 25 below, wherein each record is related to the corresponding entry in frequent flyer EF 708 (i.e., record one in EF 718 corresponds to record one in EF 708, and so on.)

TABLE 25

Exemplary PIN EF file structure

| Record description | External format | | Internal format (bytes) | |
|---|---|---|---|---|
| | Size | Type | Size | Type |
| PIN | 8 | AN | 8 | BIN |
| Expiration date | 8 | D | 4 | BCD |

Preferences EF 716, in a particularly preferred embodiment, comprises a preferences array as shown in Table 26 below. The preference values stored in this file correspond to those discussed below in conjunction with Table 38.

TABLE 26

Exemplary preferences EF 716 file structure

| Record description | External format | | Internal format (bytes) | |
|---|---|---|---|---|
| | Size | Type | Size | Type |
| Preferences Array | 8 | C | 8 | BIN |

Rental Car Application

Referring now to FIG. 8, rental car application 414 preferably comprises common DF 802, directory EF 820, and one or more rental_car DFs 803 (i.e., 803(a), 803(b), and so on) corresponding to individual rental car agencies.

Common DF comprises preferences EF 805, which is described in detail below. Rental_car DFs 803 each comprise a rental_car_id EF 807, reservation EF 809, and expenses EF 811.

Directory EF 820 includes a list of application identifiers and labels for the various DFs under rental_car application 414. The structure of this EF preferably conforms to that described above in the context of cardholder ID application 406.

In a particularly preferred embodiment, preferences EF 805 comprises a set of preferences arrays file structure as shown in Table 27 below. A preferred list of preference codes for use in each of these arrays is described below in conjunction with Table 38.

TABLE 27

Exemplary preferences EF

| Record description | External format | | Internal format (bytes) | |
|---|---|---|---|---|
| Preferences Array (Default) | 8 | C | 8 | BIN |
| Preferences Array (No. 2) | 8 | C | 8 | BIN |
| Preferences Array (No. 3) | 8 | C | 8 | BIN |
| Preferred limousine company | 12 | AN | 12 | ASCII |

Rental_car_id 807 is used to store frequent rental information, upgrade information, insurance information, and the like. In a particularly preferred embodiment, rental_car_id 807 comprises a file structure as shown in Table 28 below.

TABLE 28

Exemplary rental_car_id EF

| Record description | External format | | Internal format (bytes) | |
|---|---|---|---|---|
| Frequent Rental ID# | 22 | A | 22 | ASCII |
| Company name | 3 | A | 3 | ASCII |
| Unique Customer ID | 19 | A | 19 | ASCII |
| CDP (Contract Disc. Program) | 10 | A | 10 | ASCII |
| Accumulated points | 8 | N | 3 | BIN |
| Rental features | | AR | 2 | BIN |
| Car Type Upgrade | | B | 1 bit | B |
| Week-end/Vacation Special | | B | 1 bit | B |
| Guaranteed Late Reservation | | B | 1 bit | B |
| Insurance | | Array | 2 | BIN |
| Loss Damage Waiver (LDW) | | B | 1 bit | B |
| Personal Automobile Insurance | | B | 1 bit | B |
| Personal Effects Coverage | | B | 1 bit | B |
| Personal Insurance | | B | 1 bit | B |
| Corporate Insurance | | B | 1 bit | B |

Reservation EF 809 is used to store confirmation numbers corresponding to one or more rental car reservations. In a particularly preferred embodiment, reservation EF 809 comprises a plurality of records (e.g., two) having a file structure as shown in Table 29 below.

TABLE 29

Exemplary reservation EF

| Record description | External format | | Internal format (bytes) | |
|---|---|---|---|---|
| Rental Car Company | 3 | A | 3 | ASCII |
| Location | 3 | A | 3 | ASCII |
| Date | 8 | D | 4 | BCD |
| Time | 4 | T | 2 | BCD |
| Reservation Number | 15 | A | 15 | ASCII |
| Flight Number | 5 | M | 5 | BIN |
| Airlines | 3 | AN | 3 | ASCII(RJ) |
| Flight number | 4 | K | 2 | BCD |
| Preferred profile | 1 | C | 1 | ASCII |

Expenses EF 811 is used to record expenses incurred by the cardholder during car rental (e.g., the total rental charge). In a particularly preferred embodiment, expenses EF 811 comprises a plurality of records (e.g., five) having a file structure as shown in Table 30 below.

TABLE 30

Exemplary expenses EF

| Record description | External format | | Internal format (bytes) | |
|---|---|---|---|---|
| Type of expense | 1 | C | 1 | ASCII |
| Date | 8 | D | 4 | BCD |
| Location code | 3 | AN | 3 | ASCII |
| Amount | 7 | N | 3 | BIN |

Hotel Application

Referring now to FIG. 9, hotel system application 412 preferably comprises directory EF 920, common DF 914, one or more hotel chain DFs 902, and one or more property DFs 903.

Common DF 914 comprises reservation EF 918, expenses EF 916, key-of-the-room EF 910, and preferences EF 912.

Hotel chain EFs 902(a), 902(b), and so on, comprise preferences EF 904 and stayer ID EF 906 associated with individual hotel chains. In contrast, property EFs 903(a), 903(b), and so on, comprise a similar file structure associated with individual hotel properties (i.e., independent of whether the particular hotel is a member of a nationwide chain).

In a particularly preferred embodiment, reservation EF 918 comprises a plurality of records having the structure shown in Table 31 below. In general, this EF is used to store confirmation numbers transmitted to smartcard 100 when the cardholder makes a reservation at a given hotel (designated in the property code field). The date field stores the date on which the confirmation number was dispensed.

TABLE 31

Exemplary reservation EF

| Record description | External format | | Internal format (bytes) | |
|---|---|---|---|---|
| | Size | Type | Size | Type |
| Property Code | 3 | AN | 3 | ASCII |
| Date | 8 | D | 4 | BCD |
| Confirmation Number | 15 | AN | 15 | ASCII |

Preferences EF 912 preferably comprises three sets of array preferences. The particular codes used in these arrays are discussed below in conjunction with Table 38.

TABLE 32

Exemplary preferences EF

| Record description | External format | | Internal format (bytes) | |
|---|---|---|---|---|
| | Size | Type | Size | Type |
| Preferences Array (default) | 8 | C | 8 | BIN |
| Preferences Array (number 2) | 8 | C | 8 | BIN |
| Preferences Array (number 3) | 8 | C | 8 | BIN |

Expenses EF 916 preferably comprises a list of recent hotel expenses, for example, room costs, dinner expenses, and the like. In a particularly preferred embodiment, expenses EF 916 comprises a plurality of records (for example, fifteen) arranged in a cyclic file structure and comprising the fields shown in Table 33 below. Thus, the cardholder is able to examine and print a list of recently incurred expenses by type (a code fixed by convention), date, amount, and property code.

TABLE 33

Exemplary expenses EF

| Record description | External format | | Internal format (bytes) | |
|---|---|---|---|---|
| | Size | Type | Size | Type |
| Type | 1 | C | 1 | ASCII |
| Date | 8 | D | 4 | BCD |
| Property Code | 3 | AN | 3 | ASCII |
| Amount | 7 | N | 3 | BIN |

Key-of-the-room EF 910 preferably comprises electronic key values that can be used in conjunction with card readers to provide access to particular hotel rooms. In a particularly preferred embodiment, key-of-the-room EF 910 comprises a plurality of alphanumeric key values as shown in Table 34 below.

TABLE 34

Exemplary key-of-the-room EF

| Record description | External format | | Internal format (bytes) | |
|---|---|---|---|---|
| | Size | Type | Size | Type |
| Key value | 40 | AN | 40 | BIN |

Stayer ID EF 906 preferably comprises frequent stayer data for a particular hotel chain. In a particularly preferred embodiment, Stayer ID EF 906 comprises frequent stayer information as shown in Table 35 below.

TABLE 35

Exemplary stayer ID EF

| Record description | External format | | Internal format (bytes) | |
|---|---|---|---|---|
| | Size | Type | Size | Type |
| Frequent stayer number | 19 | AN | 19 | ASCII |
| Frequent Stayer Level Code | 1 | AN | 1 | ASCII |
| Frequent Stayer Level Expiration Date | 6 | YYYYMM | 3 | BCD |
| CDP | 10 | AN | 10 | ASCII |
| Event Counter | 3 | N | 1 | BIN |
| Hotel Frequent Stayer PIN | 8 | AN | 8 | BIN |

Preferences EF 904 preferably comprises three sets of array preferences as shown in Table 36. The particular codes used in these arrays are discussed below in conjunction with Table 38.

TABLE 36

Exemplary preferences EF

| Record description | External format | | Internal format (bytes) | |
|---|---|---|---|---|
| | Size | Type | Size | Type |
| Preferences Array (default) | 8 | C | 8 | BIN |
| Preferences Array (number 2) | 8 | C | 8 | BIN |
| Preferences Array (number 3) | 8 | C | 8 | BIN |

Property DFs 903(*a*), 903(*b*), etc., are used in cases where the partnering hotel is not part of a major chain, or when the hotel chooses to employ its own data set independent of its affiliation. In one embodiment, these property DFs are identical in structure to hotel chain DFs 902, except that much of the frequent stayer ID information is removed. More specifically, a typical property DF 903 comprises a preferences EF 938 identical to preferences 904 described above, along with a stayer ID EF 934 which includes only the CDP, event counter, and hotel frequent stayer PIN fields described in conjunction with Table 33 above. Alternatively, a particular hotel chain or property might choose to implement a different file structure than that described above.

Preference Codes

As mentioned briefly above, a preferred embodiment is configured such that preferences are located in several files distributed throughout smartcard 100; i.e., in preferences EF 514, airline preferences EF 716, hotel preferences EF 912 and 904, and car preferences EF 810. This allows apparently conflicting preferences to coexist within the card depending on context. For example, it is possible to opt for non-smoking in the cardholder ID application while choosing the smoking option within the hotel application. In the case of conflict, preferences are read from the top level to the bottom level, and each level supersedes the previous one.

An exemplary set of codification rules are set forth in Table 37 below:

TABLE 37

Exemplary Preferences Code Ranges

| | |
|---|---|
| 0–49 | General purpose (Cardholder ID 406) |
| 50–99 | Hotel application 412 |
| 100–149 | Rental car application 414 |

TABLE 37-continued

Exemplary Preferences Code Ranges

| | |
|---|---|
| 150–199 | Airline application 410 |
| 200–255 | Other |

More specifically, in a preferred exemplary embodiment, preference flags are coded as set forth in Table 38 below.

TABLE 38

Exemplary preference codes

| Preference | Code (decimal) |
|---|---|
| GENERAL PURPOSE | |
| Smoking | 00 |
| Non-smoking | 01 |
| Home as preferred address | 02 |
| Work as preferred address | 03 |
| Handicapped | 04 |
| Home as preferred e-mail address | 05 |
| Work as preferred e-mail address | 06 |
| HOTEL PREFERENCES | |
| King-size bed | 50 |
| Queen-size bed | 51 |
| Double bed | 52 |
| High floor room | 53 |
| Low floor room | 54 |
| Near elevator room | 55 |
| Away from elevator room | 56 |
| RENTAL CAR PREFERENCES | |
| Compact car | 100 |
| Standard car | 101 |
| Mid-size car | 102 |
| Luxury car | 103 |
| AIRLINE PREFERENCES | |
| Window seat preferred | 150 |
| Aisle seat preferred | 151 |
| Low calorie | 152 |
| Vegetarian | 153 |
| Diabetic | 154 |
| Low sodium | 155 |
| Kosher | 156 |

Security

In the context of smartcard transactions, data security has five primary dimensions: 1) data confidentiality, 2) data integrity, 3) access control, 4) authentication, and 5) non-repudiation. Each of these dimensions is addressed through a variety of security mechanisms. Data confidentiality, which deals with keeping information secret (i.e., unreadable to those without access to a key), is substantially ensured using encryption technology. Data integrity (and data source verification) focuses on ensuring that data remains unchanged during transfer, and typically employs message authentication techniques. Access control involves card holder verification and other requirements necessary in order for a party to read or update a particular file. Authentication involves ensuring that the card and/or the external device is what it purports to be, and non-repudiation deals with the related task of ensuring that the source of the data or message is authentic, i.e., that a consumer may not repudiate a transaction by claiming that it was "signed" by an unauthorized party.

Authentication is preferably performed using a "challenge/response" algorithm. In general, authentication through a challenge/response system involves: 1) generation of a random number by a first party; 2) transmission of the random number to a second party (the "challenge", 3) encryption of the random number by the second party in accordance with a key known to both parties, 4) transmission of the encrypted random number to the first party (the "response"), 5) encryption of the random number by the first party, and 6) comparison by the first party of the two resulting numbers. In the case where the two numbers match, authentication is successful; if not, the authentication is unsuccessful. Note that authentication can work both ways: the external world might request authentication of a smartcard (internal authentication), and a smartcard might request authentication of the external world (external authentication). A more detailed account of a preferred challenge/response algorithm can be found in the IBM MFC specification.

In a preferred embodiment, the DES algorithm (Data Encryption Standard) is employed for the various security functions; however, it will be appreciated that any number of other symmetrical or asymmetrical techniques may be used in the context of the present invention. More particularly, there are two general categories of encryption algorithms: symmetric and asymmetric. Symmetric algorithms use the same key for encryption and decryption, for example, DEA (data encryption algorithm) which uses a 56-bit key to encrypt 64-bit blocks of data. Asymmetric algorithms, in contrast, use two different keys: one secret key and one public key. The RSA algorithm, for example, uses two such keys and exploits the computational complexity of factoring very large prime numbers. Additional information these and other cryptographic principles can be found in a number of standard texts, for example: Seberry & Pieprzyk, CRYPTOGRAPHY: AN INTRODUCTION TO COMPUTER SECURITY (1989); Rhee, CRYPTOGRAPHY AND SECURE COMMUNICATIONS (1994); Stinson, CRYPTOGRAPHY: THEORY AND PRACTICE (1995); CONTEMPORARY CRYPTOGRAPHY: THE SCIENCE OF INFORMATION INTEGRITY (1992); and Schneier, APPLIED CRYPTOGRAPHY (2d ed. 1996), the contents of which are hereby incorporated by reference.

Access control is suitably provided by including access conditions within the header of each EF and DF. This prevents a particular operation (e.g., reading or updating) from being performed on a file unless the required access conditions have been fulfilled. Many different access conditions are appropriate in a smart card context. For example, the smartcard might require cardholder verification (i.e., request that the cardholder enter a PIN) before a file operation is allowed. Similarly, internal and/or external authentication as described above might be required.

Another important access condition (referred to herein as the SIGN condition) corresponds to the case where a particular file is "protected" and where updating of a record requires "signing" of the data using a message authentication code (MAC). a MAC can be thought of as a form of electronic seal used to authenticate the content of the message. In a paradigmatic signing procedure, a shortened, encrypted representation of the message (the MAC) is created using a message authentication algorithm (MAA) in conjunction with a key known to both the card and external device. The MAC is then appended onto the message and sent to the card (or external device, depending on context), and the card itself generates a MAC based on the received message and the known key. The card then compares the received MAC with the its own internally-generated MAC. If either the message or MAC was altered during transmission, or the sending party did not use the correct key, then the two MACs will not match, and the access condition will not be fulfilled. If the two MACs correspond, then the access condition is fulfilled, and the particular file operation can proceed.

A MAC may be generated using a variety of MAAs, for example, the ANSI X9.9 method using an eight-byte key, or the ANSI X9.19 method using a sixteen-byte key. Furthermore, the actual key may be "diversified" through encryption with a random number or other appropriate value. These and other details regarding MAC generation can be found in the references cited above as well as the IBM MFC specification.

Two other important access conditions are the NEVER and FREE conditions. The NEVER condition corresponds to the case where a certain file operation (typically updating) is never allowed. The FREE condition, on the other hand, corresponds to the case where either updating or reading a file record is always allowed, without any additional preconditions for access.

In contrast to the MAC techniques discussed briefly above, non-repudiation is necessarily performed using asymmetrical techniques. That is, as symmetrical techniques such as MAC "sealing" use a key known to more than one party, such techniques can not be used by a third party to ascertain whether the source of the message is correct. Thus, non-repudiation typically employs a public key encryption scheme (e.g., the Zimmerman's PGP system), wherein the sender uses a secret key to "sign" the message, and the receiving party uses the corresponding public key to authenticate the signature. In the context of the present invention, this function is suitably performed by allocating an EF for public and secret key rings, which are well known in the art, along with suitable encryption software resident in the card for assembling the signed message.

Having thus given a brief overview of typical smartcard security procedures, an exemplary set of access conditions is set forth below in Table 40. In this regard, the various access conditions for each EF are tabulated with regard to whether the file is being read or updated. In each case, the access condition (FREE, SIGN, etc.), key "owner" (issuer, partner, user, etc.), and key name are listed. In this regard, it will be appreciated that the key name is arbitrary, and is listed here for the sake of completeness.

TABLE 40

Exemplary access conditions

| | READING | | | UPDATING | | |
|---|---|---|---|---|---|---|
| | Access condition | Owner | Key | Access condition | Owner | Key |
| MF | | | | | | |
| DF Cardholder ID 406 | | | | | | |
| DF Holder_ID 502 | | | | | | |
| EF ID 504 | FREE | | | SIGN | ISSUER | KEY1 |
| EF Home 506 | FREE | | | SIGN | ISSUER | KEY1 |
| EF Business 508 | FREE | | | SIGN | ISSUER | KEY1 |
| EF Preferences 514 | FREE | | | SIGN | ISSUER | KEY1 |
| EF Passport 516 | FREE | | | SIGN | ISSUER | KEY1 |
| EF Biometrics 522 | FREE | | | SIGN | ISSUER | KEY1 |
| EF Driver 518 | FREE | | | SIGN | ISSUER | KEY1 |
| DF Miscellaneous | | | | | | |
| EF Payment card 510 | FREE | | | SIGN | ISSUER | KEY1 |
| EF Sequence 512 | FREE | | | FREE | | |
| EF Card Number 526 | FREE | | | SIGN | ISSUER | KEY1 |
| DF Payment System 408 | | | | | | |
| DF Issuer 602 | | | | | | |
| EF Pay1 604 | FREE | | | FREE | | |
| DF Airline 410 | | | | | | |
| DF Common 702 | | | | | | |
| EF Passenger 706 | FREE | | | SIGN | ISSUER | KEY2 |
| EF Frequent flier 708 | FREE | | | SIGN | ISSUER | KEY2 |
| EF IET 710 | FREE | | | FREE | | |
| EF Boarding 712 | FREF | | | FREE | | |
| EF Biometric 714 | FREE | | | FREE | | |
| DF Issuer 704 | | | | | | |
| EF Preferences 716 | FREE | | | SIGN | ISSUER | KEY2 |
| EF PIN 718 | FREE | | | SIGN | ISSUER | KEY2 |
| EF Issuance 720 | FREE | | | SIGN | ISSUER | KEY2 |
| DF Rental car 414 | | | | | | |
| DF Common 802 | | | | | | |
| EF Preferences 805 | FREE | | | USER | IDENT | PIN |
| DF Rental_car 803 | | | | | | |
| EF Rental_car_ID 807 | FREE | | | SIGN | RENTCAR | KEY6 |
| EF Reservation 809 | FREE | | | FREE | | |
| EF Expenses 811 | FREE | | | SIGN (append) | RENTCAR (append) | KEY6 (append) |
| | | | | IDENT (erase) | USER (erase) | PIN (erase) |
| DF Hotel system 412 | | | | | | |

TABLE 40-continued

Exemplary access conditions

| | READING | | | UPDATING | | |
|---|---|---|---|---|---|---|
| | Access condition | Owner | Key | Access condition | Owner | Key |
| DF Common 914 | | | | | | |
| EF Reservation 918 | FREE | | | FREE | | |
| EF Expenses 916 | FREE | | | FREE (append) IDENT (erase) | USER (erase) | PIN (erase) |
| EF Key-of-the-room 910 | FREE | | | FREE | | |
| EF Preferences 912 | FREE | | | SIGN | ISSUER | KEY1 |
| DF Hotel_chain 902 | | | | | | |
| EF Preferences 904 | FREE | | | SIGN | ISSUER | KEY1 |
| EF Stayer ID 906 | FREE | | | SIGN | HOTEL | KEY5 |

Transactions

Having thus given a detailed description of an exemplary smartcard 100 and a preferred data structure 400, the various details related to transactions involving smartcard 100 will now be described. In general, a typical smartcard session involves: (1) activation of the contacts (or comparable non-contact means); (2) card reset; (3) Answer to reset (ATR) by card; (4) Information exchange between card and host; and, at the conclusion of a session, (5) deactivation of contacts.

First, card 100 is inserted in a card reader provided at an access point 15, and suitable connections are made between communication region 104 on card 100 and the card reader. In a preferred embodiment, physical contacts (contacts 106 in FIG. 1) are used, and DATA, CLOCK, RESET, VDD, and GND connections are made. These contacts are electrically activated in a particular sequence, preferably in accordance with ISO 7816-3 (RST to low state, VDD powered, DATA to reception mode, then CLK applied).

The card reader then initiates a reset (i.e., RST to high state), and the card returns an answer to reset string (ATR) on the DATA line, preferably in conformance with the content and timing details specified in the appropriate parts of ISO 7816. In a preferred embodiment, the interface characters are chosen to reflect a T=1 protocol (asynchronous, half-duplex, block-oriented mode). Further in accordance with ISO-7816-3, after the card sends an ATR string and the proper protocol is selected (in a preferred embodiment, the T=1 mode), host 314 and card 100 begin the exchange of commands and responses that comprise a particular transaction. The nature of these commands is discussed in further detail below.

At the end of a smartcard session, contacts 106 are deactivated. Deactivation of contacts 106 is preferably performed in the order specified in ISO 7816-3 (i.e., RST to low state, CLK to low state, DATA to low state, VDD to inactive state). As mentioned above, the VPP contact is not utilized in a preferred embodiment.

In the context of the present invention, command classes and instructions are provided for 1) working with application data (i.e., files stored within the various applications), 2) ensuring data security, 3) card management, and 4) performing miscellaneous functions.

Application data commands are suitably directed at selecting, reading, and updating individual records or groups of records within files. Security commands suitably include commands for performing the challenge/response authentication process, generating random numbers, loading or updating cryptographic keys, and changing and verifying the card-holder verification codes (CHV1 and CHV2). Card management commands suitably include commands which allow for the creation and deletion of directories (DFs) and elementary files (EFs). Miscellaneous commands are suitably provided for modifying the baud rate and reading various card statistics (e.g., data logged during production of the card.) It will be appreciated that many different command sets could be designed for implementing these basic functions. One such command set is provided by the IBM Multifunction Card Operating System 3.51, hereby incorporated by reference.

Referring again to FIG. 10, access point 15 preferably comprises software which provides a user interface (for example, a graphical user interface) and is capable of executing the appropriate SCOS commands in accordance with the particular transaction being effected. For example, consider the case where a cardholder wishes to add a preference in car preferences EF 810 within rental car application 414 (shown in FIG. 8). In this instance, a cardholder would locate a convenient access point 15 (for example, a stand-alone kiosk in a mall) and insert card 100 in a provided card reader in order to initiate a transaction. After suitable handshaking between card 100 and the card reader has taken place, and after the cardholder has been properly authenticated (i.e., the correct access conditions for updating car preferences EF 810 have been fulfilled), the application program at access point 15 queries the user with a choice of preference codes (for example, those listed in Table 39 above). The user then indicates a choice—through textual or graphical means, and the appropriate value is sent to card 100 by the application program as part of a command string. This value may then be sent to the appropriate partnering organization 12 (i.e., a rental car partner) and issuer 10 over network 19 to be stored in their respective databases 13 and 11. Alternatively, this data may be sent later as part of a card/database synchronization procedure, e.g., when the original transaction proceeds off-line.

Consider, as another example, the typical hotel transaction. As detailed above, the cardholder inserts card 100 into a card reader deployed at a suitable access point 15. After appropriate initialization procedures take place, the cardholder is presented, through the use of a graphical user interface, the option to make a hotel reservation. Upon choosing this option, the software may interrogate the hotel preferences field in preferred programs EF 524 in cardholder ID application 406 and display these hotels first within the list of possible choices.

After the cardholder selects a specific hotel property, the software contacts the appropriate partner 12 over network 19 and requests a hotel room for a particular set of dates. This step might involve an interrogation of the various files within hotel system application 412 to which the particular hotel has access (i.e., a hotel chain DF 902 or property DF 903), or this step may be deferred until check-in (as described below).

Once a reservation has been made, the associated confirmation number supplied by the hotel is downloaded into the confirmation number field in reservation EF 918 along with the date and the property code of the hotel. This step might require the cardholder to transmit appropriate credit card information, which is suitably retrieved from pay1 EF 604.

Upon arrival at the hotel, the cardholder may use smartcard 100 to access a kiosk or other convenient access point provided for check-in. Thus, check-in may take place unassisted by hotel personnel, or may involve a more traditional person-to-person interaction where card 100 is used primarily to streamline the check-in process initiated by personnel at the front desk.

At check-in, the confirmation number information is retrieved from reservation EF 918., and a particular room is assigned (if not assigned previously). This step will typically involve retrieving, from the appropriate preference file (i.e., preferences EF 904 or 912), a list of preferences regarding bed size, room type, and the like. This list may be matched against the hotel's database of available rooms, thereby helping to streamline the room assignment process.

Once a room is assigned, a digital key corresponding to the assigned room (e.g., a numeric value or alphanumeric string) may be stored in key-of-the-room EF 910. Card readers are then employed as part of the door lock apparatus for each room, which are configured to open only upon receiving the correct key.

At check-out time, payment may take place using payment card information stored in payment card EF 510 and pay1 EF 604. Again, a suitable smartcard reader (i.e., an access point 15), may be provided in any location convenient for check out, e.g., the hotel lobby or within the individual hotel rooms themselves. The cardholder may then acquire frequent stayer points, which would involve updating one of the stayer ID EFs 906 (or 936). During the course of his stay at the hotel, the cardholder may have incurred any number of expenses related to room-service, on-site dining, film viewing, and the like. These expenses, or a subset thereof, may be conveniently downloaded into expenses EF 916 for later retrieval, printout, or archiving.

Use of card 100 in a rental car context would necessarily involve many of the same steps described above. The task of assigning a car would involve retrieving car preferences stored within preferences EF 805 and comparing them to a database of available automobiles. Upon returning the automobile, the cardholder might then be awarded frequent rental points (through update of frequent renter EF 807), and an expense record might be stored within expenses EF 811.

In the airline context, card 100 could be used to make reservations, record preferences, and provide a payment means as described above. In addition, electronic tickets may be downloaded (EF IET 710), and boarding information may be supplied via boarding EF 712. Frequent flyer EF 708 may then be used to update the cardholder's frequent flyer miles.

While the example transactions set forth above are described in general terms, the particular nature of data flow to and from the appropriate memory locations within the card will be apparent to those skilled in the art.

Moreover, although the inventions set forth herein have been described in conjunction with the appended drawing figures, those skilled in the art will appreciate that the scope of the invention is not so limited. For example, although the preferred embodiment of the invention is discussed in the context of a standard, credit card-sized smartcard with external contacts, it will be appreciated that virtually any portable memory device suitably configured may be utilized to practice this invention, for example, contactless cards, optical cards, minicards, "super-smart" cards, and the like. Hence, various modifications in the design and arrangement of the components and steps discussed herein may be made without departing from the scope of the invention as set forth in the appended claims.

What is claimed is:

1. A smartcard apparatus of the type configured to communicate with an external device to perform a transaction, said smartcard apparatus comprising:

a smartcard body;

an integrated circuit device disposed within said smartcard body and configured to communicate with said external device, said integrated circuit device comprising a common application and a second application, said second application being configured to store travel-related information associated with a cardholder;

communicating means for providing data communication between said integrated circuit device and said external device; and said second application comprising a common file structure and a partner file structure, wherein said partner file structure provides write access to a field within said partner file structure for a first partnering organization and denies write access to said field for a second partnering organiztion, and said common file structure provides write access for both said first and second partners to at least one filed in said common file structure.

2. The smartcard apparatus of claim 1, wherein said communication means comprises a plurality of external contacts disposed on a surface of said smartcard body.

3. The smartcard apparatus of claim 1, wherein said second application comprises a payment system application.

4. The smartcard apparatus of claim 3, wherein said payment system application is configured to store an account number and an expiry date associated with a payment account.

5. The smartcard apparatus of claim 1, wherein said second application comprises an airline application.

6. The smartcard apparatus of claim 5, wherein said airline application is configured to store an electronic ticket.

7. The smartcard apparatus of claim 1, wherein said second application comprises a hotel application.

8. The smartcard apparatus of claim 7, wherein said hotel application is configured to store data associated with a hotel reservation.

9. The smartcard apparatus of claim 1, wherein said second application comprises a rental car application.

10. The smartcard apparatus of claim 9, wherein said rental car application is configured to store data associated with a car preference.

11. The smartcard apparatus of claim 1, wherein said common application comprises an application configured to store indicia of said cardholder's identity.

12. The smartcard apparatus of claim 11, wherein said indicia of said cardholder's identity includes a name and an address.

13. The smartcard apparatus of claim 1, wherein said common application provides general read access.

14. A distributed transaction comprising:

a network for transmitting transaction information:

a partnering organization having an associated partnering organization server, said partnering organization server being configured to send and receive said transaction information over said network;

a smartcard access point, said smartcard access point being configured to interface with a smartcard and to accept user input, wherein said access point is further configured to send and receive said transaction information over said network in response to said user input, said smartcard comprising;

a smartcard body;

an integrated circuit device disposed within said smartcard body and configured to communicate with said smartcard access point, said integrated circuit device comprising a common application and a second application, said second application being configured to store travel-related information associated with a cardholder;

said second application comprising a common filed structure and a partner file structure, wherein said partner file structure provides write access to a field within said partner file structure for a first partnering organization and denies write access to said field for a second partnering organization, and said common file structure provides write access for both said first and second partners to at least one field in said common file structure; and communication means for providing data communication between said integrated circuit device and said smartcard access point.

* * * * *

UNITED STATES PATENT AND TRADEMARK OFFICE
CERTIFICATE OF CORRECTION

PATENT NO.    : 6,101,477
DATED         : January 23, 1998
INVENTOR(S)   : Hole, et al.

It is certified that error appears in the above-identified patent and that said Letters Patent is hereby corrected as shown below:

Claim 1, column 28, line 40, the word "filed" is a typographical error and should be replaced with --field--.

Claim 13, column 30, line 6, the word "filed" is a typographical error and should be replaced with --file--.

Signed and Sealed this

Seventeenth Day of April, 2001

Attest:

NICHOLAS P. GODICI

Attesting Officer

Acting Director of the United States Patent and Trademark Office